United States Patent
Zhang et al.

(10) Patent No.: US 11,564,254 B2
(45) Date of Patent: Jan. 24, 2023

(54) DYNAMIC SINGLE FREQUENCY NETWORK AREA WITH LISTEN BEFORE TALK UNCERTAINTY

(71) Applicant: QUALCOMM Incorporated, San Diego, CA (US)

(72) Inventors: Xiaoxia Zhang, San Diego, CA (US); Jing Sun, San Diego, CA (US); Mostafa Khoshnevisan, San Diego, CA (US); Le Liu, Fremont, CA (US); Alberto Rico Alvarino, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/063,638

(22) Filed: Oct. 5, 2020

(65) Prior Publication Data

US 2021/0321452 A1 Oct. 14, 2021

Related U.S. Application Data

(60) Provisional application No. 63/008,211, filed on Apr. 10, 2020.

(51) Int. Cl.
*H04W 74/00* (2009.01)
*H04L 5/00* (2006.01)
(Continued)

(52) U.S. Cl.
CPC ........... *H04W 74/008* (2013.01); *H04L 5/005* (2013.01); *H04L 5/10* (2013.01); *H04W 72/005* (2013.01);
(Continued)

(58) Field of Classification Search
CPC ............. H04W 74/008; H04W 72/005; H04W 72/0446; H04W 72/046; H04W 74/0808; H04L 5/005; H04L 5/10
See application file for complete search history.

(56) References Cited

U.S. PATENT DOCUMENTS

2018/0091212 A1* 3/2018 Lee ................... H04L 5/0048
2018/0205469 A1 7/2018 Nagaraja et al.
(Continued)

FOREIGN PATENT DOCUMENTS

EP         3823337 A1    5/2021
WO    WO-2020012662 A1   1/2020

OTHER PUBLICATIONS

CATT: "Remaining Issues of Scell BFR," 3GPP Draft, 3GPP TSG-RAN WG2 Meeting #107bis, R2-1914382, 3rd Generation Partnership Project (3GPP), Mobile Competence Centre, 650, Route Des Lucioles, F-06921, Sophia-Antipolis Cedex, France, vol. RAN WG2, No, Reno, USA, Nov. 18, 2019-Nov. 22, 2019, Nov. 8, 2019 (Nov. 8, 2019), XP051816466, 4 pages, Retrieved from the Internet: URL: https://ftp.3gpp.org/tsg_ran/WG2_RL2/TSGR2_108/Docs/R2-1914382.zip R2-1914382.doc[retrieved on Nov. 8, 2019], 2.2 Remaining issue with candidate beam configuration.
(Continued)

*Primary Examiner* — Chae S Lee
(74) *Attorney, Agent, or Firm* — Holland & Hart LLP/Qualcomm

(57) ABSTRACT

Methods, systems, and devices for wireless communications are described. A base station may determine a transmission beam configuration for transmitting multicast data to a user equipment (UE) in a joint transmission using a set of transmission/reception points (TRPs) based on outcomes of listen before talk (LBT) procedures performed at the TRPs. In some examples, the base station may indicate to the UE that the UE is to determine a UE beam configuration and a
(Continued)

quasi co-location (QCL) relationship associated with the TRPs for receiving the multicast data based on signaling from the TRPs. In some examples, the base station may transmit multicast data from a first TRP (e.g., a serving cell) during a first transmission opportunity (TxOP), and the UE may determine the QCL relationship for the set of TRPs. During a second TxOP, the base station may transmit multicast data in a joint transmission from the set of TRPs.

30 Claims, 24 Drawing Sheets

(51) Int. Cl.
    *H04W 74/08*     (2009.01)
    *H04L 5/10*     (2006.01)
    *H04W 72/04*     (2009.01)
    *H04W 72/00*     (2009.01)

(52) U.S. Cl.
    CPC ..... *H04W 72/046* (2013.01); *H04W 72/0446* (2013.01); *H04W 74/0808* (2013.01)

(56) References Cited

U.S. PATENT DOCUMENTS

| | | | |
|---|---|---|---|
| 2019/0116467 A1* | 4/2019 | Belleschi | H04W 4/06 |
| 2020/0068548 A1* | 2/2020 | Guan | H04L 5/0053 |
| 2020/0314818 A1* | 10/2020 | Jin | H04B 7/0408 |
| 2021/0014838 A1* | 1/2021 | Liou | H04W 72/0446 |
| 2021/0120581 A1* | 4/2021 | Kim | H04W 72/14 |
| 2021/0218500 A1* | 7/2021 | Bhamri | H04L 1/1825 |

OTHER PUBLICATIONS

International Search Report and Written Opinion—PCT/US2021/021960—ISA/EPO—dated Jun. 29, 2021.
National Taiwan University: "Discussion on Beam-Forming Support in NR Multicast," 3GPP Draft, 3GPP TSG RAN WG1 Meeting #86, R1-167771 Discussion on Beam-Forming Support in NR Multicast V1,3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 22, 2016-Aug. 26, 2016, Aug. 21, 2016 (Aug. 21, 2016), XP051126089, 2 pages, Retrieved from the Internet:URL: http://www.3gpp.org/ftp/Meetings_3GPP_SYNC/RAN1/Docs/ [retrieved on Aug. 21, 2016] 2, Discussion on Beamforming support for multicast in NR.

* cited by examiner

DYNAMIC SINGLE FREQUENCY NETWORK AREA WITH LISTEN BEFORE TALK UNCERTAINTY

CROSS REFERENCE

The present Application for Patent claims the benefit of U.S. Provisional Patent Application No. 63/008,211 by ZHANG et al., entitled "DYNAMIC SINGLE FREQUENCY NETWORK AREA WITH LISTEN BEFORE TALK UNCERTAINTY," filed Apr. 10, 2020, assigned to the assignee hereof, and expressly incorporated by reference herein.

FIELD OF TECHNOLOGY

The following relates generally to wireless communications and more specifically to dynamic single frequency network area with listen before talk uncertainty.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may support multicast communications with UEs, in which the system transmits information to multiple UEs simultaneously. The system may transmit the information using a base station associated with the system.

SUMMARY

The described techniques relate to improved methods, systems, devices, and apparatuses that support dynamic single frequency network area with listen before talk uncertainty. Generally, the described techniques provide for enabling a base station to determine a transmission beam configuration for transmitting multicast information to a user equipment (UE) in a joint transmission using a set of transmission/reception points (TRPs) in an unlicensed radio frequency spectrum band. The base station may determine the transmission beam configuration based on outcomes of listen before talk (LBT) procedures performed at the TRPs. In some examples, the base station may indicate to the UE that the UE is to determine a UE beam configuration for receiving the multicast transmission. The base station may transmit the multicast transmission, along with signaling which the UE may use to determine the UE beam configuration. In some examples, the UE may additionally determine a quasi co-location (QCL) relationship associated with the TRPs based on the received signaling. In some examples, the base station may transmit multicast data from a first TRP (e.g., a serving cell) during a first transmission opportunity (TxOP), and the UE may determine the QCL relationship for the set of TRPs. During a second TxOP, the base station may transmit multicast data in a joint transmission from the set of TRPs.

A method of wireless communications at a UE is described. The method may include receiving an indication that the UE is to determine a UE beam configuration to use to receive, during a slot, a multicast data signal from a set of transmission reception points, receiving, during a slot from the set of transmission reception points, the multicast data signal and signaling that is used to determine the UE beam configuration, determining, based on the received indication and the received signaling, the UE beam configuration for the slot, and decoding the received multicast data signal based on the determined UE beam configuration.

An apparatus for wireless communications at a UE is described. The apparatus may include a processor, memory coupled with the processor, and instructions stored in the memory. The instructions may be executable by the processor to cause the apparatus to receive an indication that the UE is to determine a UE beam configuration to use to receive, during a slot, a multicast data signal from a set of transmission reception points; receive, during a slot from the set of transmission reception points, the multicast data signal and signaling that is used to determine the UE beam configuration; determine, based on the received indication and the received signaling, the UE beam configuration for the slot; and decode the received multicast data signal based on the determined UE beam configuration.

Another apparatus for wireless communications at a UE is described. The apparatus may include means for receiving an indication that the UE is to determine a UE beam configuration to use to receive, during a slot, a multicast data signal from a set of transmission reception points; receiving, during a slot from the set of transmission reception points, the multicast data signal and signaling that is used to determine the UE beam configuration; determining, based on the received indication and the received signaling, the UE beam configuration for the slot; and decoding the received multicast data signal based on the determined UE beam configuration.

A non-transitory computer-readable medium storing code for wireless communications at a UE is described. The code may include instructions executable by a processor to receive an indication that the UE is to determine a UE beam configuration to use to receive, during a slot, a multicast data signal from a set of transmission reception points; receive, during a slot from the set of transmission reception points, the multicast data signal and signaling that is used to determine the UE beam configuration; determine, based on the received indication and the received signaling, the UE beam configuration for the slot; and decode the received multicast data signal based on the determined UE beam configuration.

Some examples of the method, apparatuses, and non-transitory computer-readable medium described herein may further include operations, features, means, or instructions for determining that the multicast data signal may be from the set of transmission reception points based on the received signaling that may be used to determine the UE beam configuration, and identifying a set of candidate beam configurations associated with the set of transmission reception points, where the UE beam configuration for the slot may be determined based on a combination of the identified set of candidate beam configurations.

Some examples of the method, apparatuses, and non-transitory computer-readable medium described herein may further include operations, features, means, or instructions for receiving a configuration identifying the set of candidate beam configurations, each candidate beam configuration of the set of candidate beam configurations associated with a transmission reception point of the set of transmission reception points.

In some examples of the method, apparatuses, and non-transitory computer-readable medium described herein, the received signaling includes a set of activity signals, each activity signal of the set of activity signals corresponding to one of the set of transmission reception points.

Some examples of the method, apparatuses, and non-transitory computer-readable medium described herein may further include operations, features, means, or instructions for identifying, based on the received indication, a presence of additional reference signals from the set transmission reception points, and receiving the additional reference signals in the slot based on the identifying, where the UE beam configuration for the slot may be determined based on the determined UE beam configuration and the received additional reference signals.

Some examples of the method, apparatuses, and non-transitory computer-readable medium described herein may further include operations, features, means, or instructions for receiving a configuration identifying resources for the UE to use to receive the additional reference signals.

In some examples of the method, apparatuses, and non-transitory computer-readable medium described herein, the additional reference signals include demodulation reference signals.

In some examples of the method, apparatuses, and non-transitory computer-readable medium described herein, the additional reference signals may be received in a first one or more symbol periods of the slot that precede a second one or more symbol periods of the slot associated with the received multicast data signal.

Some examples of the method, apparatuses, and non-transitory computer-readable medium described herein may further include operations, features, means, or instructions for determining a quasi co-location relationship associated with the received multicast data signal based on the received signaling, where the received multicast data signal may be decoded based on the determined quasi co-location relationship.

In some examples of the method, apparatuses, and non-transitory computer-readable medium described herein, the indication may be received in a control channel transmission.

In some examples of the method, apparatuses, and non-transitory computer-readable medium described herein, the UE beam configuration includes a transmission configuration indication state.

In some examples of the method, apparatuses, and non-transitory computer-readable medium described herein, the multicast data signal may be received on a downlink shared channel.

A method of wireless communications at a base station is described. The method may include performing a listen before talk procedure to determine that a set of transmission reception points are available during a slot to transmit a multicast data signal to a UE; transmitting, to the UE, an indication that the UE is to determine a UE beam configuration to use to receive, during the slot, the multicast data signal from the set of transmission reception points; and transmitting, during the slot from the set of transmission reception points, the multicast data signal and signaling that is to be used by the UE to determine the UE beam configuration.

An apparatus for wireless communications at a base station is described. The apparatus may include a processor, memory coupled with the processor, and instructions stored in the memory. The instructions may be executable by the processor to cause the apparatus to perform a listen before talk procedure to determine that a set of transmission reception points are available during a slot to transmit a multicast data signal to a UE; transmit, to the UE, an indication that the UE is to determine a UE beam configuration to use to receive, during the slot, the multicast data signal from the set of transmission reception points; and transmit, during the slot from the set of transmission reception points, the multicast data signal and signaling that is to be used by the UE to determine the UE beam configuration.

Another apparatus for wireless communications at a base station is described. The apparatus may include means for performing a listen before talk procedure to determine that a set of transmission reception points are available during a slot to transmit a multicast data signal to a UE; transmitting, to the UE, an indication that the UE is to determine a UE beam configuration to use to receive, during the slot, the multicast data signal from the set of transmission reception points; and transmitting, during the slot from the set of transmission reception points, the multicast data signal and signaling that is to be used by the UE to determine the UE beam configuration.

A non-transitory computer-readable medium storing code for wireless communications at a base station is described. The code may include instructions executable by a processor to perform a listen before talk procedure to determine that a set of transmission reception points are available during a slot to transmit a multicast data signal to a UE; transmit, to the UE, an indication that the UE is to determine a UE beam configuration to use to receive, during the slot, the multicast data signal from the set of transmission reception points; and transmit, during the slot from the set of transmission reception points, the multicast data signal and signaling that is to be used by the UE to determine the UE beam configuration.

Some examples of the method, apparatuses, and non-transitory computer-readable medium described herein may further include operations, features, means, or instructions for transmitting a configuration identifying a set of candidate beam configurations for the UE to use to determine the UE beam configuration, each candidate beam configuration of the set of candidate beam configurations associated with a transmission reception point of the set of transmission reception points.

In some examples of the method, apparatuses, and non-transitory computer-readable medium described herein, the transmitted signaling includes a set of activity signals, each activity signal of the set of activity signals corresponding to one of the set of transmission reception points.

Some examples of the method, apparatuses, and non-transitory computer-readable medium described herein may further include operations, features, means, or instructions for transmitting a configuration identifying resources for the UE to use to receive additional reference signals from the set of transmission reception points, and transmitting the additional reference signals in the slot based on the transmitted indication, where the transmitted signaling includes the additional reference signals.

In some examples of the method, apparatuses, and non-transitory computer-readable medium described herein, the additional reference signals include demodulation reference signals.

In some examples of the method, apparatuses, and non-transitory computer-readable medium described herein, the additional reference signals may be transmitted in a first one or more symbol periods of the slot that precede a second one or more symbol periods of the slot associated with the transmitted multicast data signal.

In some examples of the method, apparatuses, and non-transitory computer-readable medium described herein, the indication may be transmitted in a control channel transmission.

In some examples of the method, apparatuses, and non-transitory computer-readable medium described herein, the UE beam configuration includes a transmission configuration indication state.

In some examples of the method, apparatuses, and non-transitory computer-readable medium described herein, the multicast data signal may be transmitted on a downlink shared channel transmission.

A method of wireless communications at a base station is described. The method may include performing a listen before talk procedure to determine that a set of transmission reception points are available during a first slot and a second slot to transmit a first multicast data signal for a set of UEs; transmitting, to the set of UEs based on a result of the performed listen before talk procedure, an indication of a first beam configuration for one or more of the set of transmission reception points, and transmitting, during the first slot according to the first beam configuration, the first multicast data signal to the set of UEs using a first transmission reception point of the set of transmission reception points The method may further include transmitting, to the set of UEs based on the result of the performed listen before talk procedure, an indication of a second beam configuration for the set of transmission reception points that are available to transmit the first multicast data signal to the set of UEs, and transmitting, during the second slot according to the second beam configuration for the set of transmission reception points, a second multicast data signal to the set of UEs using the set of transmission reception points.

An apparatus for wireless communications at a base station is described. The apparatus may include a processor, memory coupled with the processor, and instructions stored in the memory. The instructions may be executable by the processor to cause the apparatus to perform a listen before talk procedure to determine that a set of transmission reception points are available during a first slot and a second slot to transmit a first multicast data signal for a set of UEs; transmit, to the set of UEs based on a result of the performed listen before talk procedure, an indication of a first beam configuration for one or more of the set of transmission reception points, and transmit, during the first slot according to the first beam configuration, the first multicast data signal to the set of UEs using a first transmission reception point of the set of transmission reception points. The instructions may be further executable by the processor to cause the apparatus to transmit, to the set of UEs based on the result of the performed listen before talk procedure, an indication of a second beam configuration for the set of transmission reception points that are available to transmit the first multicast data signal to the set of UEs, and transmit, during the second slot according to the second beam configuration for the set of transmission reception points, a second multicast data signal to the set of UEs using the set of transmission reception points.

Another apparatus for wireless communications at a base station is described. The apparatus may include means for performing a listen before talk procedure to determine that a set of transmission reception points are available during a first slot and a second slot to transmit a first multicast data signal for a set of UEs; transmitting, to the set of UEs based on a result of the performed listen before talk procedure, an indication of a first beam configuration for one or more of the set of transmission reception points; and transmitting, during the first slot according to the first beam configuration, the first multicast data signal to the set of UEs using a first transmission reception point of the set of transmission reception points. The apparatus may further include means for transmitting, to the set of UEs based on the result of the performed listen before talk procedure, an indication of a second beam configuration for the set of transmission reception points that are available to transmit the first multicast data signal to the set of UEs, and transmitting, during the second slot according to the second beam configuration for the set of transmission reception points, a second multicast data signal to the set of UEs using the set of transmission reception points.

A non-transitory computer-readable medium storing code for wireless communications at a base station is described. The code may include instructions executable by a processor to perform a listen before talk procedure to determine that a set of transmission reception points are available during a first slot and a second slot to transmit a first multicast data signal for a set of UEs; transmit, to the set of UEs based on a result of the performed listen before talk procedure, an indication of a first beam configuration for one or more of the set of transmission reception points; and transmit, during the first slot according to the first beam configuration, the first multicast data signal to the set of UEs using a first transmission reception point of the set of transmission reception points. The code may further include instructions executable by a processor to transmit, to the set of UEs based on the result of the performed listen before talk procedure, an indication of a second beam configuration for the set of transmission reception points that are available to transmit the first multicast data signal to the set of UEs, and transmit, during the second slot according to the second beam configuration for the set of transmission reception points, a second multicast data signal to the set of UEs using the set of transmission reception points.

In some examples of the method, apparatuses, and non-transitory computer-readable medium described herein, the first transmission reception point includes the one or more of the set of transmission reception points, and the first beam configuration may be for the first transmission reception point.

Some examples of the method, apparatuses, and non-transitory computer-readable medium described herein may further include operations, features, means, or instructions for determining to transmit, during the first slot, unicast data signals using a remaining one or more transmission reception points of the set of transmission reception points.

Some examples of the method, apparatuses, and non-transitory computer-readable medium described herein may further include operations, features, means, or instructions for refraining from transmitting, during the first slot based on the result of the performed listen before talk procedure, the first multicast data signal to the set of UEs using a remaining one or more transmission reception points of the set of transmission reception points.

In some examples of the method, apparatuses, and non-transitory computer-readable medium described herein, the first transmission reception point includes a serving cell for the set of UEs, and the remaining one or more transmission reception points include non-serving cells for the set of UEs.

In some examples of the method, apparatuses, and non-transitory computer-readable medium described herein, the first beam configuration may be consistent with the transmission reception points that pass the performed listen before talk procedure for the first slot, and the second beam configuration may be consistent with the transmission reception points that pass the performed listen before talk procedure for the second slot.

In some examples of the method, apparatuses, and non-transitory computer-readable medium described herein, the one or more of the set of transmission reception points include the set of transmission reception points, and the first beam configuration may be for the set of transmission reception points.

Some examples of the method, apparatuses, and non-transitory computer-readable medium described herein may further include operations, features, means, or instructions for refraining from transmitting, during the first slot based on the result of the performed listen before talk procedure, on a remaining one or more transmission reception points of the set of transmission reception points.

In some examples of the method, apparatuses, and non-transitory computer-readable medium described herein, the first beam configuration may be inconsistent with the transmission reception points that pass the performed listen before talk procedure for the first slot, and the second beam configuration may be consistent with the transmission reception points that pass the performed listen before talk procedure for the second slot.

In some examples of the method, apparatuses, and non-transitory computer-readable medium described herein, the indication of the first beam configuration may be transmitted in a first downlink control information message in the first slot, and the indication of the second beam configuration may be transmitted in a second downlink control information message in the second slot.

In some examples of the method, apparatuses, and non-transitory computer-readable medium described herein, the first beam configuration includes a first transmission configuration indication state, and the second beam configuration includes a second transmission configuration indication state.

DETAILED DESCRIPTION

Figure 1:
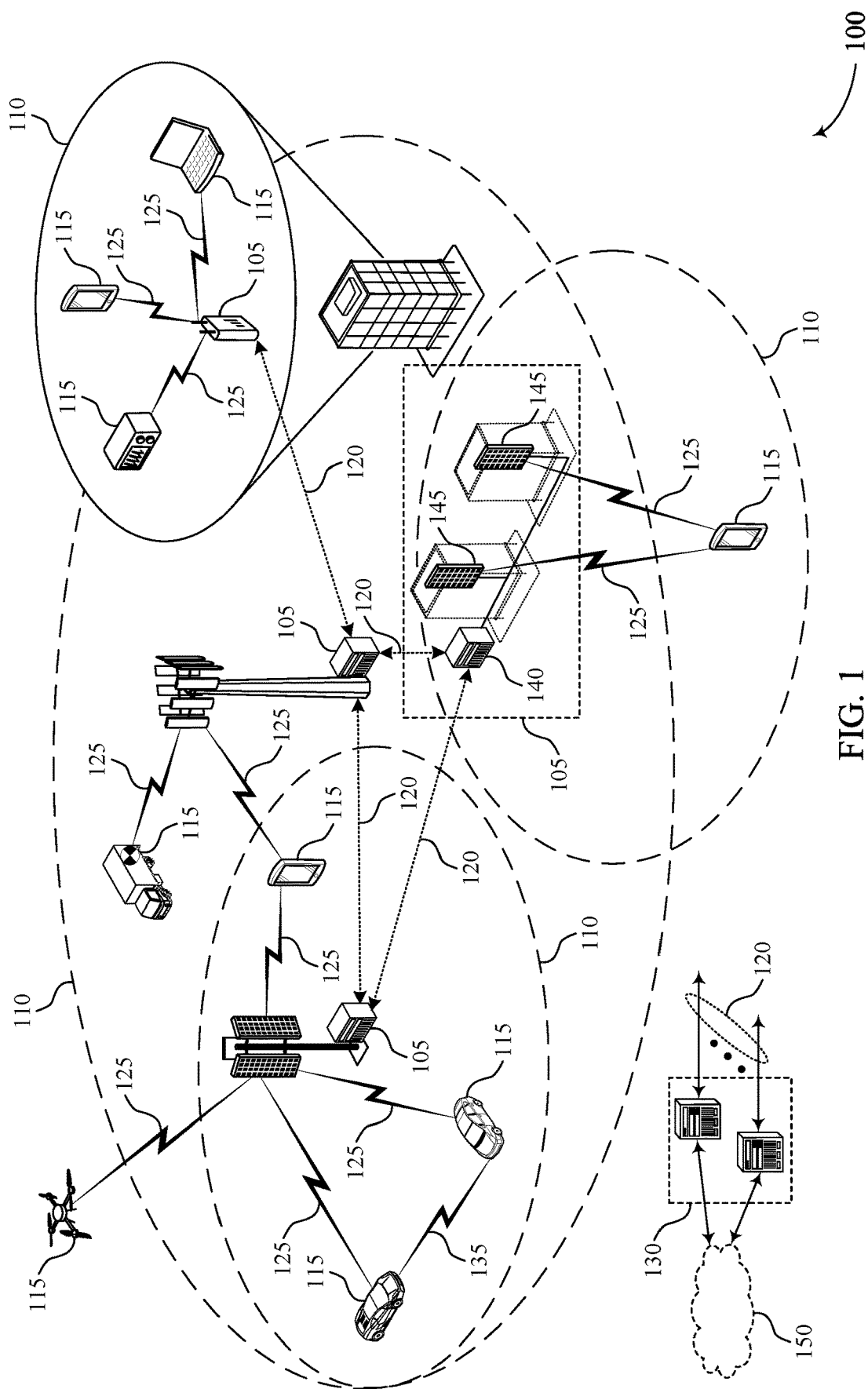
FIGS. 1 and 2 illustrate examples of a wireless communications system that supports dynamic single frequency network area with listen before talk uncertainty in accordance with aspects of the present disclosure.

A wireless communications network may support multicast communications with user equipment (UE), in which the network transmits information to multiple UEs over a multicast channel. The network may operate using one or more radio frequency spectrum bands, which may include licensed or unlicensed radio frequency spectrum bands, or both. The network may transmit the information using a base station associated with the network. The base station may transmit multicast information to all UEs in a coverage area, or the base station may transmit the information to a group of UEs in the coverage area. The base station may determine the group of UEs based on location, device type, mobility, etc.

A base station may include a set of transmission/reception points (TRPs), which may transmit multicast information to UEs in a joint transmission. For example, the base station may indicate the joint transmission to a UE in a control transmission (e.g., in a physical downlink control channel (PDCCH) transmission), along with a UE beam configuration the UE is to use to receive the joint transmission. Based on the indication from the base station, the UE may determine a quasi co-location (QCL) relationship associated with the joint transmission from the TRPs.

The base station may determine a transmission beam configuration for the TRPs transmitting the joint transmission. In some examples, the base station may determine a single frequency network (SFN) configuration (e.g., which may also be referred to as a broadcast configuration in some cases) and an associated SFN area (e.g., broadcast area) based on the TRPs transmitting in the joint transmission. In some examples, the UE beam configuration and the transmission beam configuration may each be associated with a respective transmission configuration indication (TCI) state.

In some examples, such as when the base station operates using an unlicensed radio frequency spectrum band (e.g., which may also be a shared licensed radio frequency spectrum band), the base station may perform a listen before talk (LBT) procedure at the TRPs before transmitting the multicast information in the joint transmission during a transmission opportunity (TxOP). If a TRP fails the LBT procedure, the TRP may not have medium access and may refrain from transmitting in the joint transmission. Accordingly, the TRPs transmitting in the joint transmission and the associated SFN area may be based on the outcomes of the LBT procedures. In some examples, the QCL relationship determined by the UE based on the indication from the base station may not match the joint transmission, which may impact communications efficiency and reliability at the UE.

In some examples, the base station may use a processing time to determine the outcomes of the LBT procedures and determine a transmission beam configuration for the TRPs based on the outcomes of the LBT procedures. Based on the processing time, the base station may have a limited amount of time to determine a transmission beam configuration and a UE beam configuration for the multicast transmission.

The techniques described herein may enable a base station to determine a transmission beam configuration for a set of TRPs based on the outcomes of LBT procedures at the TRPs. The base station may use the transmission beam configuration to transmit multicast information (e.g., in a multicast physical downlink shared channel (PDSCH) transmission) in a joint transmission using the set of TRPs in an unlicensed radio frequency spectrum band. In some examples, the techniques described herein may additionally enable a UE to determine a UE beam configuration for receiving the multicast information, rather than receiving an indication of the UE beam configuration from the base station. In some examples, the UE may determine a QCL relationship for the multicast transmission based on signaling from the base station.

In some examples, the base station may indicate to the UE that the UE is to determine a UE beam configuration for receiving the multicast transmission. For example, the base station may transmit a control channel (e.g., a PDCCH) transmission without an indication of a UE beam configuration. Based on the absence of the indication, the UE may determine the UE beam configuration for receiving the multicast transmission. In some examples, the base station may indicate a UE beam configuration including a null TCI state, which may also be referred to as a floating TCI state. Based on the null TCI state, the UE may determine the UE beam configuration.

In some examples, the base station may determine a set of TRPs that are available for transmitting multicast information in a first TxOP and a second TxOP based on outcomes of LBT procedures for the TRPs. The base station may indicate a first UE beam configuration for the first TxOP in a PDCCH transmission, where the first UE beam configuration may be associated with one or more of the set of TRPs based on the outcomes of the LBT procedures. The first TxOP may include a processing time for the UE to determine a QCL relationship for the set of TRPs that are available. During the first TxOP, the base station may transmit multicast data from a first TRP (e.g., a serving cell), and the UE may determine the QCL relationship for the available TRPs. During the second TxOP, the base station may transmit multicast data in a joint transmission from the available TRPs (e.g., including the serving cell and one or more additional TRPs), and the UE may receive the multicast data based on the determined QCL relationship.

Aspects of the disclosure are initially described in the context of wireless communications systems. Example transmission schemes and example process flows are then described. Aspects of the disclosure are further illustrated by and described with reference to apparatus diagrams, system diagrams, and flowcharts that relate to dynamic single frequency network area with listen before talk uncertainty.

FIG. 1 illustrates an example of a wireless communications system 100 that supports dynamic single frequency network area with listen before talk uncertainty in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may determine a transmission beam configuration for transmitting multicast information to a UE 115 in a joint transmission using a set of TRPs (e.g., one or more access network transmission entities 145) in an unlicensed radio frequency spectrum band. The base station 105 may determine the transmission beam configuration based on outcomes of LBT procedures performed at the TRPs. In some examples, the base station 105 may indicate to the UE 115 that the UE 115 is to determine a UE beam configuration for receiving the multicast transmission. The base station 105 may transmit the multicast transmission, along with signaling which the UE 115 may use to determine the UE beam configuration. In some examples, the UE 115 may additionally determine a QCL relationship associated with the TRPs based on the received signaling.

In some examples, the base station 105 may indicate a first UE beam configuration in a PDCCH transmission for a first TxOP, where the first UE beam configuration may be associated with one or more of the set of TRPs based on the outcomes of the LBT procedures. During the first TxOP, the base station 105 may transmit multicast data from a first TRP (e.g., a serving cell), and the UE 115 may determine the QCL relationship for the available TRPs. During a second TxOP, the base station 105 may transmit multicast data in a joint transmission from the available TRPs.

Figure 2:
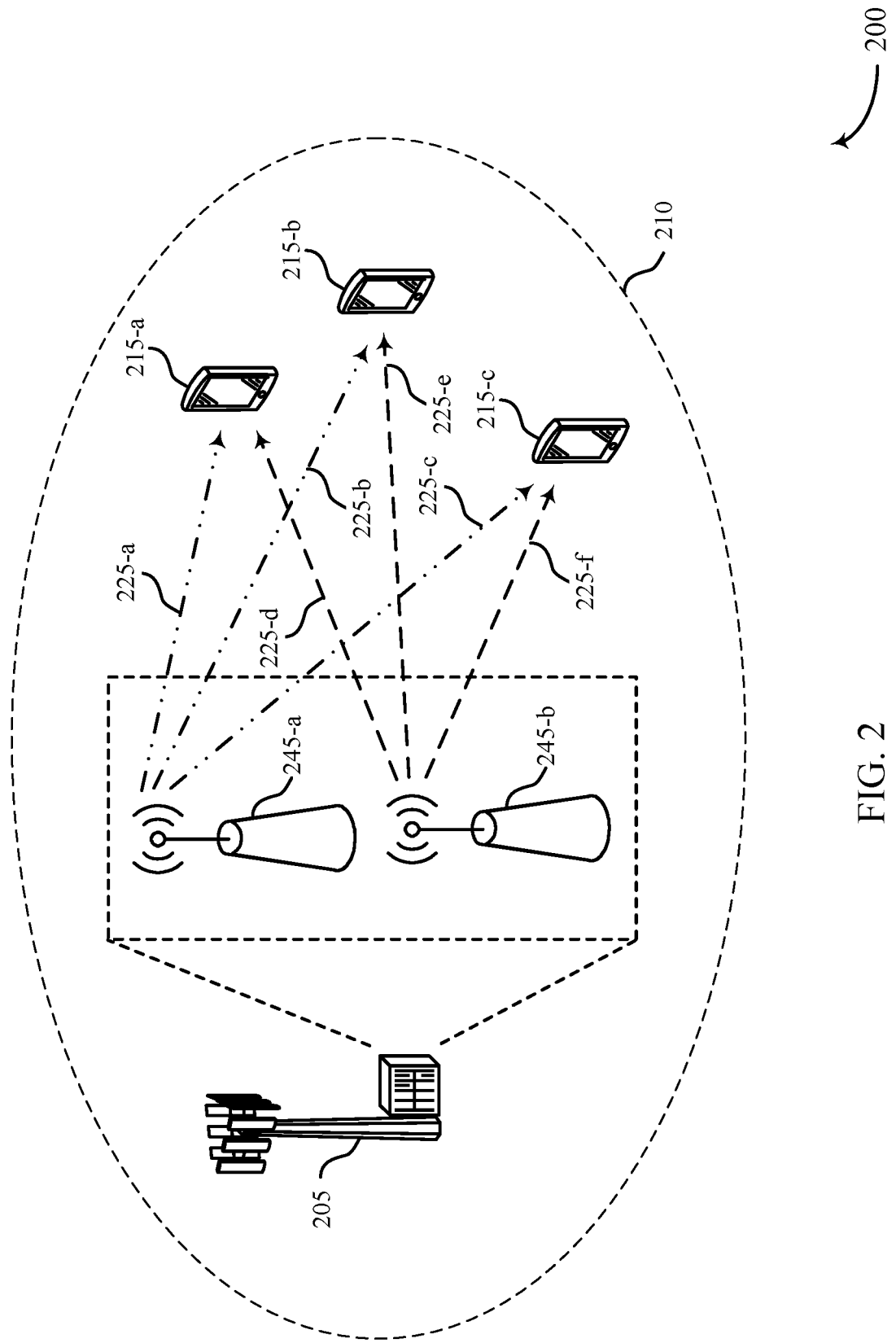

FIG. 2 illustrates an example of a wireless communications system 200 that supports dynamic single frequency network area with listen before talk uncertainty in accordance with aspects of the present disclosure. In some examples, wireless communications system 200 may implement aspects of wireless communication system 100. The wireless communications system 200 may include a base station 205, TRPs 245 and UEs 215, which may be examples of corresponding devices (e.g., access network transmission entities 145) described with reference to FIG. 1. The base station 205 may provide network coverage for a geographic coverage area 210. The base station 205 may transmit control and data transmissions (e.g., multicast transmissions) to the UEs 215 via communication links 225.

The base station 205 may include a set of TRPs 245, which may include at least a TRP 245-a and a TRP 245-b. Although two TRPs are illustrated, three or four, or more TRPs may be used consistent with the techniques described herein. The TRPs 245 may be configured to transmit multicast information (e.g., in a multicast PDSCH transmission) to the UEs 215 in a joint transmission via the communication links 225. For example, the TRP 245-a and the TRP 245-b may transmit the multicast information to the UE 215-a in a joint transmission via the communication links 225-a and 225-d. The base station 205 may perform an LBT procedure for the TRPs 245 before transmitting the multicast information in the joint transmission during a TxOP. In some examples, the base station 205 may use a processing time to determine the outcomes of the LBT procedures and determine a transmission beam configuration for the TRPs 245 based on the outcomes of the LBT procedures. Based on the processing time, the base station 205 may have a limited amount of time to determine a transmission beam configuration and UE beam configurations for the multicast transmission to the UEs 215.

In some examples, the base station 205 may indicate to a UE 215-a that the UE 215-a is to determine a UE beam configuration for receiving the multicast transmission. For example, the base station 205 may transmit a control channel (e.g., a PDCCH) transmission without an indication of a UE beam configuration. Based on the absence of the indication, the UE 215-a may determine the UE beam configuration for receiving the multicast transmission. In some examples, the base station 205 may indicate a UE beam configuration including a null TCI state, which may be referred to as a floating TCI state. Based on the null TCI state, the UE 215-a may determine the UE beam configuration.

In some examples, the base station 205 may determine a set of TRPs 245 that are available for transmitting multicast information in a first TxOP and a second TxOP based on outcomes of LBT procedures for the TRPs 245. The base station 205 may indicate a first UE beam configuration for the first TxOP in a PDCCH transmission, where the first UE beam configuration may be associated with one or more of the set of TRPs 245 based on the outcomes of the LBT procedures. The first TxOP may include a processing time for the UE 215-a to determine a QCL relationship for the set of TRPs 245 that are available. During the first TxOP, the base station 205 may transmit multicast data from a first TRP 245-a (e.g., a serving cell), and the UE 215-a may determine the QCL relationship for the available TRPs 245. During the second TxOP, the base station 205 may transmit multicast data in a joint transmission from the available TRPs 245-a and 245-b, and the UE 215-a may receive the multicast data based on the determined QCL relationship.

Figure 3:
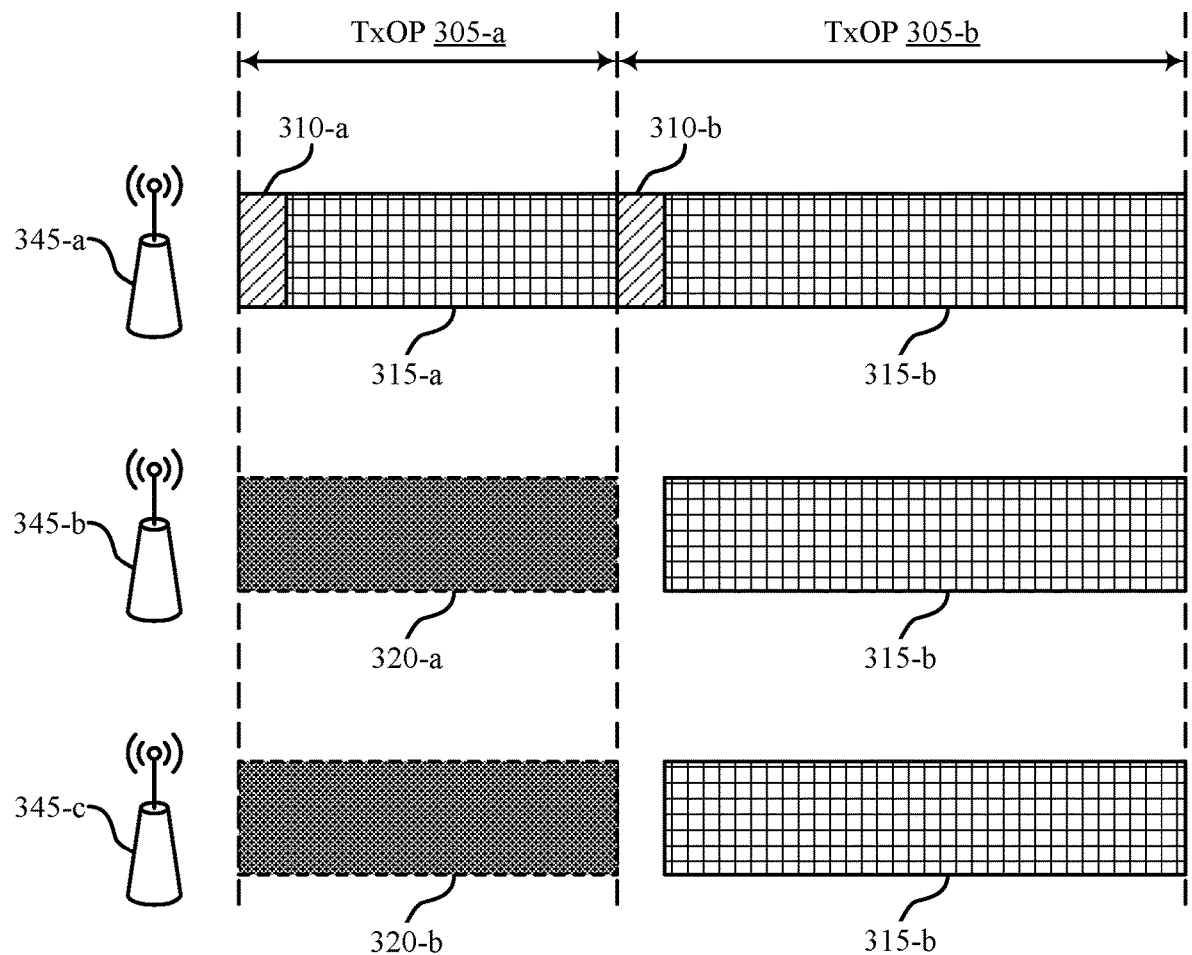
FIGS. 3 through 6 illustrate examples of transmission schemes that support dynamic single frequency network area with listen before talk uncertainty in accordance with aspects of the present disclosure.

FIG. 3 illustrates an example of a transmission scheme 300 that supports dynamic single frequency network area with listen before talk uncertainty in accordance with aspects of the present disclosure. In some examples, transmission scheme 300 may implement aspects of wireless communication systems 100 and 200. For example, the transmission scheme 300 may include example transmissions associated with a set of TRPs 345, which may be examples of corresponding devices described with reference to FIGS. 1 and 2. Additionally, the transmission scheme 300 may be associated with communications between a UE and a base station, which may be examples of corresponding devices described with reference to FIGS. 1 and 2. The transmission scheme 300 may illustrate features for improved multicast information transmission and decoding, among other benefits.

In some examples, such as when a base station operates using an unlicensed radio frequency spectrum band (e.g., or a shared licensed radio frequency spectrum band), the base station may perform LBT procedures at the TRPs 345 before transmitting a multicast data signal 315 in a joint transmission during a TxOP 305 (e.g., a slot). In the example illustrated in FIG. 3, the base station may determine, based on outcomes of the LBT procedures, that at least a TRP 345-a is available for transmitting a multicast data signal 315-a to a UE during a first TxOP 305-a. The base station may further determine that TRPs 345-a through 345-c are available for transmitting a multicast data signal 315-b in a joint transmission to the UE during a second TxOP 305-b. In some examples, the base station may transmit each multicast data signal 315 in a PDSCH transmission.

The TRP 345-a may be a serving cell for the UE. The TRP 345-a may transmit a downlink control information (DCI) message 310-a to the UE during the TxOP 305-a, for example in a PDCCH transmission. The DCI message 310-a may indicate a first UE beam configuration for receiving the multicast data signal 315-a during the TxOP 305-a. The UE may adopt the first UE beam configuration as indicated by the base station to receive the multicast data signal 315-a from the TRP 345-a during the TxOP 305-a. In some examples, the UE may determine a QCL relationship for the TRP 345-a during the TxOP 305-a, and receive the multicast data signal 315-a based on the determined QCL relationship. In some examples, the TRPs 345-b and 345-c may transmit non-multicast data signals 320 (e.g., unicast data signals) during the TxOP 305-a.

In some examples, the DCI message 310-a may include an indication that the TRPs 345-a through 345-c are available for the joint transmission during the TxOP 305-b. Based on the indication, the UE may determine a QCL relationship for the TRPs 345-a through 345-c during a processing time which includes the TxOP 305-a.

During the TxOP 305-b, the TRP 345-a may transmit a DCI message 310-b indicating a second UE beam configuration for receiving the multicast data signal 315-b during the TxOP 305-b. The second UE beam configuration may enable the UE to receive the multicast data signal 315-b in a joint transmission from the TRPs 345-a through 345-c. In some examples, the UE may receive the multicast data signal 315-b based on the determined QCL relationship for the TRPs 345-a through 345-c.

Figure 4:
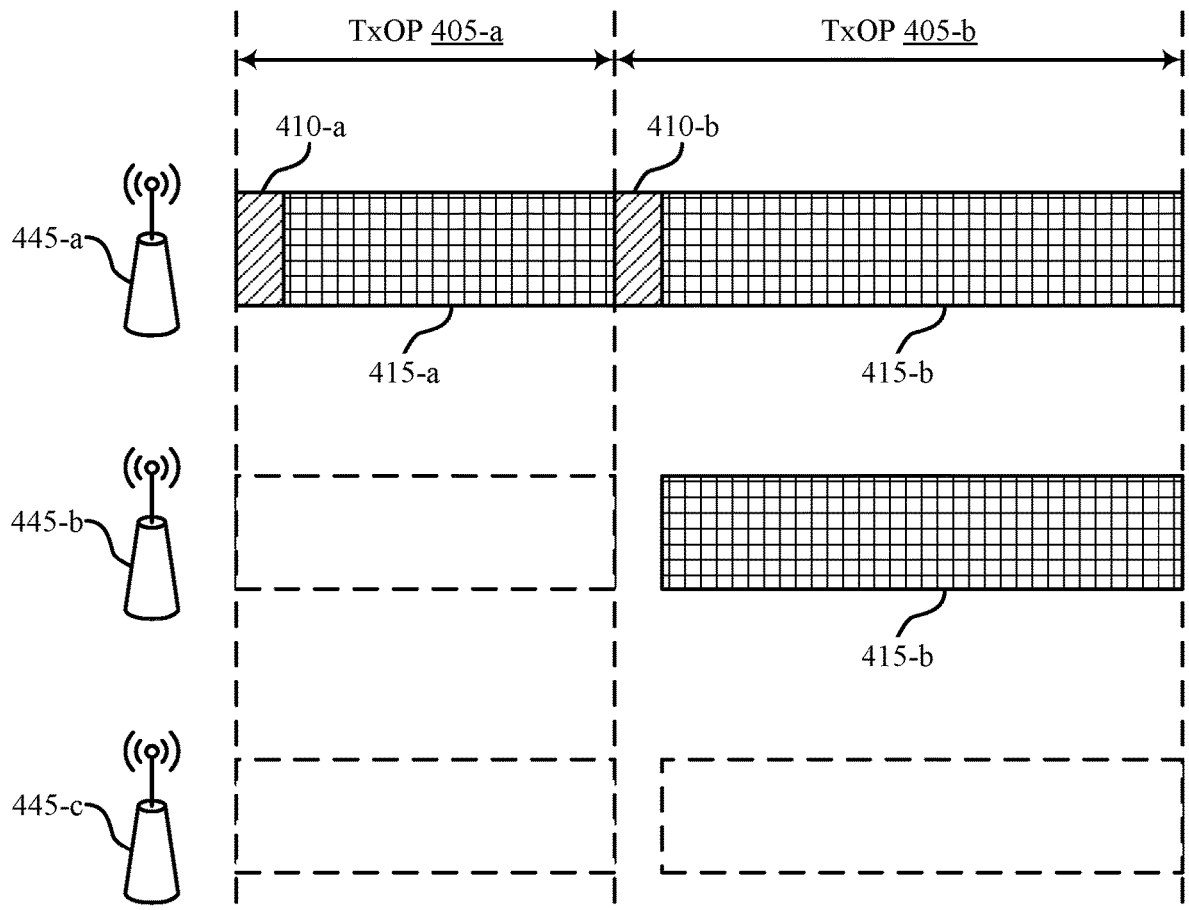
Figure 4:
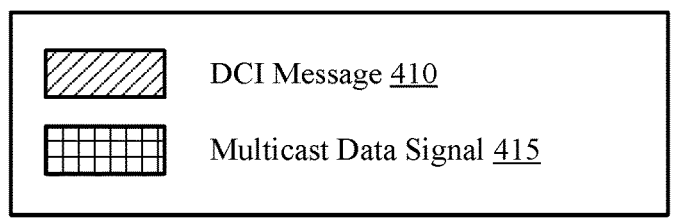

FIG. 4 illustrates an example of a transmission scheme 400 that supports dynamic single frequency network area with listen before talk uncertainty in accordance with aspects of the present disclosure. In some examples, transmission scheme 400 may implement aspects of wireless communication systems 100 and 200. For example, the transmission scheme 400 may include example transmissions associated with a set of TRPs 445, which may be examples of corresponding devices described with reference to FIGS. 1 and 2. Additionally, the transmission scheme 400 may be associated with communications between a UE and a base station, which may be examples of corresponding devices described with reference to FIGS. 1 and 2. The transmission scheme 400 may illustrate features for improved multicast information transmission and decoding, among other benefits.

In some examples, such as when a base station operates using an unlicensed radio frequency spectrum band (e.g., or a shared licensed radio frequency spectrum band), the base station may perform LBT procedures at the TRPs 445 before transmitting a multicast data signal 415 in a joint transmission during a TxOP 405 (e.g., a slot). In the example illustrated in FIG. 4, the base station may determine, based on outcomes of the LBT procedures, that a TRP 445-a is available for transmitting a multicast data signal 415-a to a UE during a first TxOP 405-a, while TRPs 445-b and 445-c do not have medium access. The base station may further determine the TRPs 445-a and 445-b are available for transmitting a multicast data signal 415-b in a joint transmission to the UE during a second TxOP 405-b, while the TRP 445-c does not have medium access. In some examples, the base station may transmit each multicast data signal 415 in a PDSCH transmission.

The TRP 445-a may be a serving cell for the UE. The TRP 445-a may transmit a DCI message 410-a to the UE during the TxOP 405-a, for example in a PDCCH transmission. The DCI message 410-a may indicate a first UE beam configuration for receiving the multicast data signal 415-a during the TxOP 405-a. The UE may adopt the first UE beam configuration as indicated by the base station to receive the multicast data signal 415-a from the TRP 445-a during the TxOP 405-a. In some examples, the UE may determine a QCL relationship for the TRP 445-a during the TxOP 405-a, and receive the multicast data signal 415-a based on the determined QCL relationship. The UE may be configured to determine the QCL relationship based on a multicast area (e.g., an SFN area, a preconfigured multicast area, etc.), which may not match the TRPs 445 transmitting during the TxOP 405-a.

In some examples, the DCI message 410-a may include an indication that the TRPs 445-a and 445-b are available for the joint transmission during the TxOP 405-b. Based on the indication, the UE may determine a QCL relationship for the TRPs 445-a and 445-b during a processing time which includes the TxOP 405-a. Alternatively, the UE may be configured to determine the QCL relationship based on the preconfigured multicast area, which may not match the TRPs 445 transmitting during the TxOP 405-b.

During the TxOP 405-b, the TRP 445-a may transmit a DCI message 410-b indicating a second UE beam configuration for receiving the multicast data signal 415-b during the TxOP 405-b. The second UE beam configuration may enable the UE to receive the multicast data signal 415-b in a joint transmission from the TRPs 445-a and 445-b. In some examples, the UE may receive the multicast data signal 415-b based on the determined QCL relationship for the TRPs 445-a and 445-b.

Figure 5:
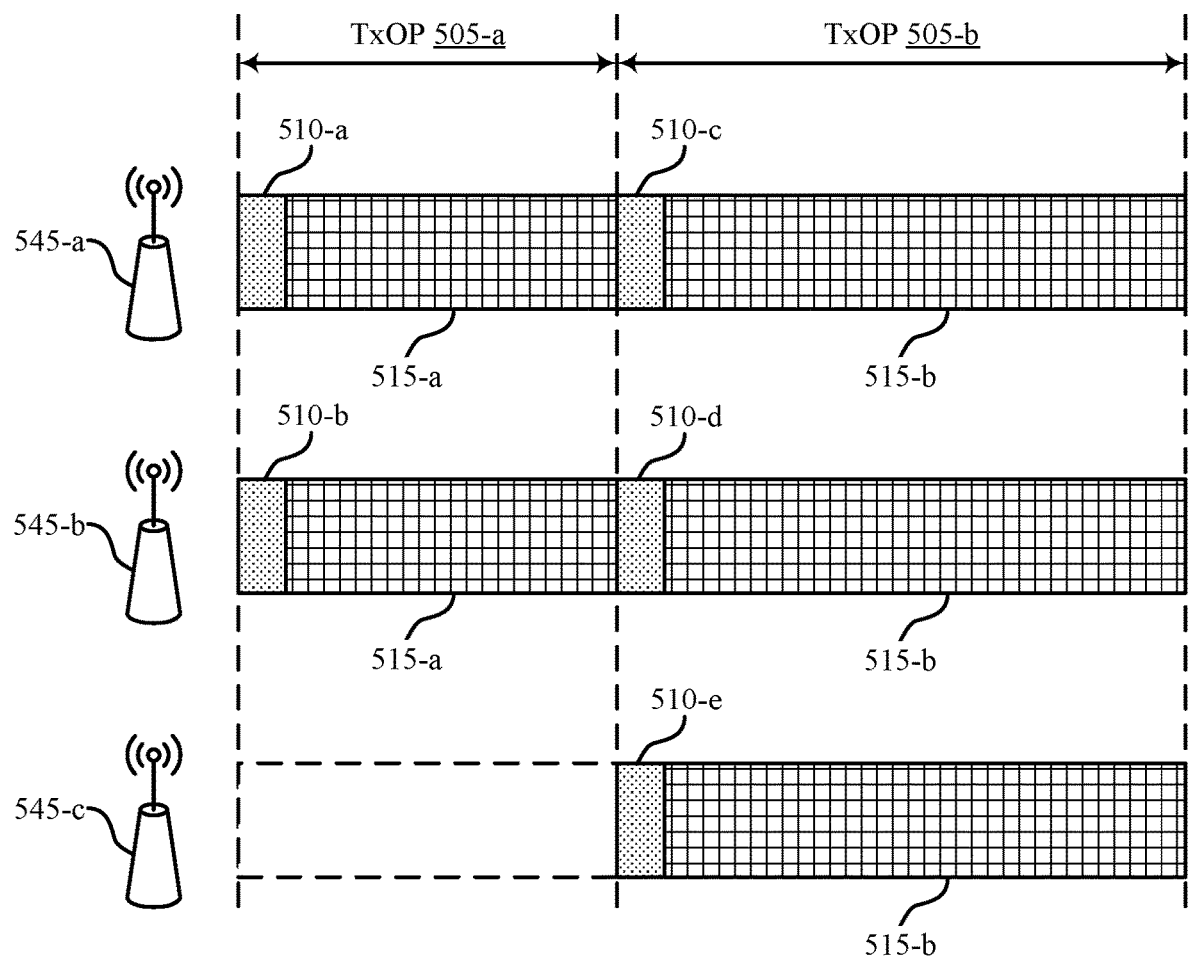

FIG. 5 illustrates an example of a transmission scheme 500 that supports dynamic single frequency network area with listen before talk uncertainty in accordance with aspects of the present disclosure. In some examples, transmission scheme 500 may implement aspects of wireless communication systems 100 and 200. For example, the transmission scheme 500 may include example transmissions associated with a set of TRPs 545, which may be examples of corresponding devices described with reference to FIGS. 1 and 2. Additionally, the transmission scheme 500 may be associated with communications between a UE and a base station, which may be examples of corresponding devices described with reference to FIGS. 1 and 2. The transmission scheme 500 may illustrate features for improved multicast information transmission and decoding, among other benefits.

In some examples, such as when a base station operates using an unlicensed radio frequency spectrum band (e.g., or a shared licensed radio frequency spectrum band), the base station may perform LBT procedures at the TRPs 545 before transmitting a multicast data signal 515 in a joint transmission during a TxOP 505 (e.g., a slot). In the example illustrated in FIG. 5, the base station may determine, based on outcomes of the LBT procedures, that TRPs 545-a and 545-b are available for transmitting a multicast data signal 515-a to a UE during a first TxOP 505-a, while a TRP 545-c does not have medium access. The base station may further determine the TRPs 545-a through 545-c are available for transmitting a multicast data signal 515-b in a joint transmission to the UE during a second TxOP 505-b. In some examples, the base station may transmit each multicast data signal 515 in a PDSCH transmission.

The base station may transmit an indication to the UE that the UE is to determine a UE beam configuration for receiving a multicast data signal 515 during each TxOP 505. In some examples, the UE may identify a set of candidate UE beam configurations which the UE may adopt to receive and successfully decode a multicast data signal 515. Additionally or alternatively, the base station may transmit a configuration identifying the set of candidate UE beam configurations to the UE.

Each TRP 545 may be configured to transmit one or more activity signals 510 during each TxOP 505 in which the TRP 545 participates in the joint transmission. For example, the TRP 545-a may transmit an activity signal 510-a along with the multicast data signal 515-a during the TxOP 505-a, and the TRP 545-b may transmit an activity signal 510-b along with the multicast data signal 515-a. Based on the activity signals 510-a and 510-b, the UE may determine the UE beam configuration for receiving the multicast data signal 515-a during the TxOP 505-a. Similarly, the UE may determine a UE beam configuration for receiving the multicast data signal 515-b during the TxOP 505-b based on activity signals 510-c through 510-e from the TRPs 545-a through 545-c. In some examples, the UE may determine a QCL relationship associated with a multicast data signal 515 in a TxOP 505 based on the activity signals 510 received in the TxOP 505.

In some examples, the activity signals 510 may indicate that a particular TRP is active by a base station transmitting a reference signal in a particular set of time and/or frequency resources or ports corresponding to the corresponding TRP. For example, a first set of time and/or frequency resources or ports may correspond to TRP 545-a, such that the presence of a signal (e.g., a reference signal or sequence) in the first set of time and/or frequency resources or ports indicates transmission and activity by TRP 545-a. Similarly, the signal being present in a second and third set of time and/or frequency resources or ports may correspond to TRP 545-b and TRP 545-c, respectively such that the presence of a signal (e.g., a reference signal or sequence) in the second or third set of time and/or frequency resources or ports indicates transmission by TRP 545-b or TRP 545-c, respectively.

In some examples, the activity signals for the different TRP 545-a, TRP 545-b, TRP 545-c may be distinguished by the use of different scrambling for the transmitted signal (e.g., reference signal, sequence, etc.). For example, different scrambling may be used to transmit the activity signal, but transmitted on a common set of time and/or frequency resources or ports, or both. The activity signals may be transmitted as part of a control channel (e.g., a PDCCH) or may be a separately-transmitted sequence (e.g., outside the control channel or PDCCH).

Figure 6:
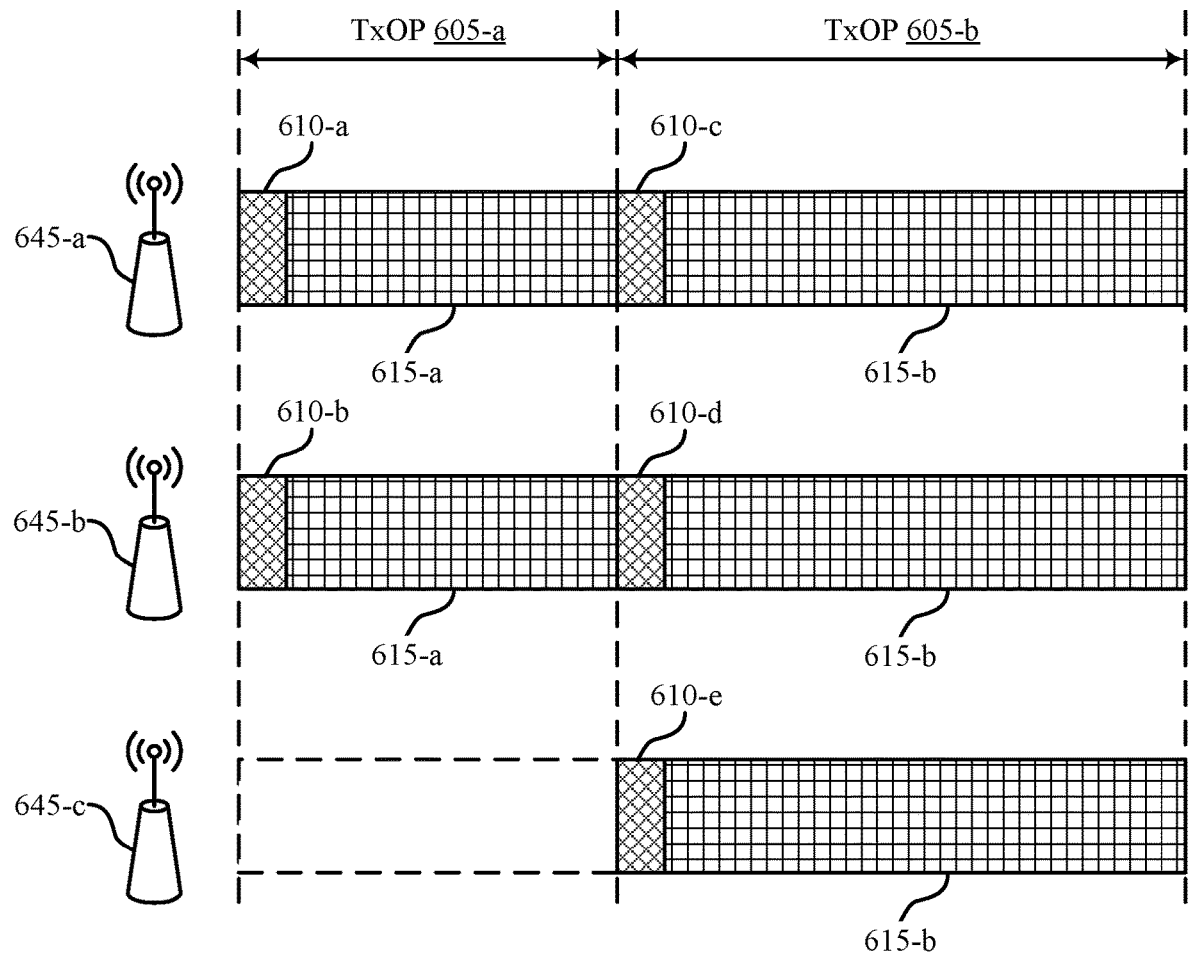
Figure 6:
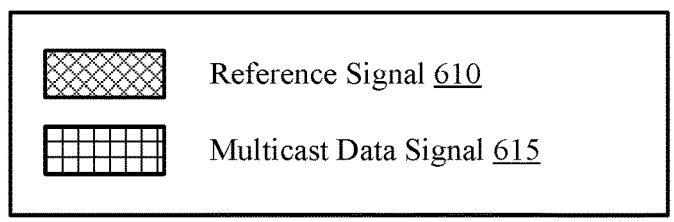

FIG. 6 illustrates an example of a transmission scheme 600 that supports dynamic single frequency network area with listen before talk uncertainty in accordance with aspects of the present disclosure. In some examples, transmission scheme 600 may implement aspects of wireless communication systems 100 and 200. For example, the transmission scheme 600 may include example transmissions associated with a set of TRPs 645, which may be examples of corresponding devices described with reference to FIGS. 1 and 2. Additionally, the transmission scheme 600 may be associated with communications between a UE and a base station, which may be examples of corresponding devices described with reference to FIGS. 1 and 2. The transmission scheme 600 may illustrate features for improved multicast information transmission and decoding, among other benefits.

In some examples, such as when a base station operates using an unlicensed radio frequency spectrum band (e.g., a shared radio frequency spectrum band), the base station may perform LBT procedures at the TRPs 645 before transmitting a multicast data signal 615 in a joint transmission during a TxOP 605 (e.g., a slot). In the example illustrated in FIG. 6, the base station may determine, based on outcomes of the LBT procedures, that TRPs 645-a and 645-b are available for transmitting a multicast data signal 615-a to a UE during a first TxOP 605-a, while a TRP 645-c does not have medium access. The base station may further determine the TRPs 645-a through 645-c are available for transmitting a multicast data signal 615-b in a joint transmission to the UE during a second TxOP 605-b. In some examples, the base station may transmit each multicast data signal 615 in a PDSCH transmission.

The base station may transmit an indication to the UE that the UE is to determine a UE beam configuration for receiving a multicast data signal 615 during each TxOP 605. In some examples, the UE may identify a set of candidate UE beam configurations which the UE may adopt to receive and successfully decode a multicast data signal 615. Additionally or alternatively, the base station may transmit a configuration identifying the set of candidate UE beam configurations to the UE.

Each TRP 645 may be configured to transmit additional reference signals 610 (e.g., a demodulation reference signal (DMRS), including DMRS on a particular port, including time and/or frequency resources for such DMRS) during each TxOP 605 in which the TRP 645 participates in the joint transmission. For example, the TRP 645-a may transmit an additional reference signal 610-a before the multicast data signal 615-a during the TxOP 605-a, and the TRP 645-b may transmit an additional reference signal 610-b before the multicast data signal 615-a. Based on the additional reference signals 610-a and 610-b, the UE may determine the UE beam configuration for receiving the multicast data signal 615-a during the TxOP 605-a. Similarly, the UE may determine a UE beam configuration for receiving the multicast data signal 615-b during the TxOP 605-b based on additional reference signals 610-c through 610-e from the TRPs 645-a through 645-c. In some examples, the UE may determine a QCL relationship associated with a multicast data signal 615 in a TxOP 605 based on the additional reference signals 610 received in the TxOP 605.

Figure 7:
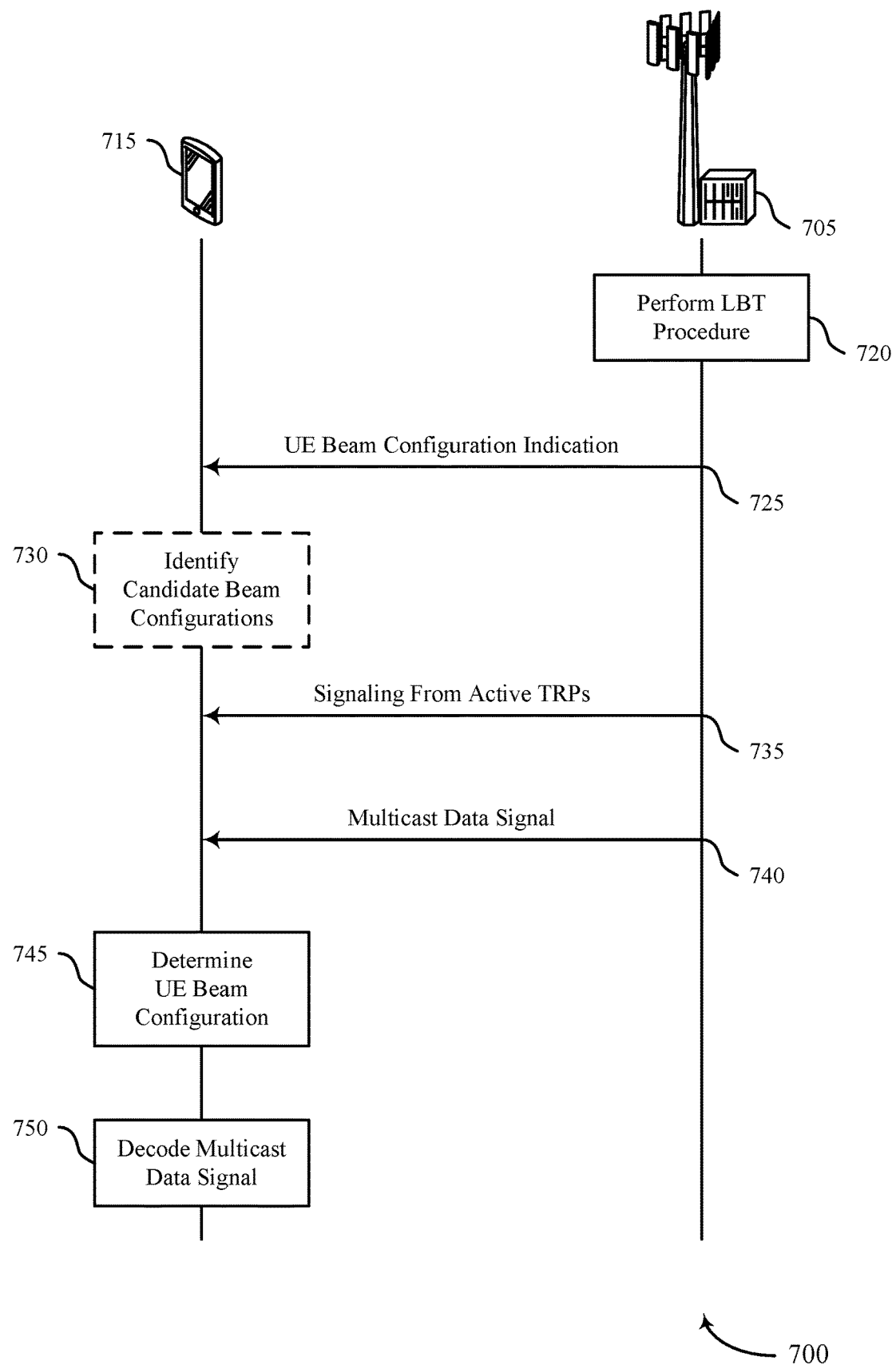
FIGS. 7 and 8 illustrate examples of process flows that support dynamic single frequency network area with listen before talk uncertainty in accordance with aspects of the present disclosure.

FIG. 7 illustrates an example of a process flow 700 that supports dynamic single frequency network area with listen before talk uncertainty in accordance with aspects of the present disclosure. In some examples, the process flow 700 may implement aspects of wireless communications systems 100 and 200. For example, the process flow 700 may include example operations associated with one or more of a base station 705 or a UE 715, which may be examples of the corresponding devices described with reference to FIGS. 1 and 2. In the following description of the process flow 700, the operations between the base station 705 and the UE 715 may be performed in a different order than the example order shown, or the operations performed by the base station 705 and the UE 715 may be performed in different orders or at different times. Some operations may also be omitted from the process flow 700, and other operations may be added to the process flow 700. The operations performed by the base station 705 and the UE 715 may support improvement to the base station 705 multicast information transmission operations and, in some examples, may promote improvements to data transmission processing for the UE 715, among other benefits.

At 720, the base station 705 may perform an LBT procedure at a set of TRPs to determine which TRPs are available for transmitting a multicast data signal in a joint transmission to the UE 715 during a TxOP. Based on the outcome of the LBT procedure, the base station 705 may determine a transmission beam configuration for the available TRPs.

At 725, the base station 705 may transmit an indication to the UE 715 that the UE 715 is to determine a UE beam configuration for receiving the multicast data signal. For example, the base station 705 may transmit a control channel (e.g., a PDCCH) transmission without an indication of a UE beam configuration. Based on the absence of the indication, the UE 715 may determine the UE beam configuration for receiving the multicast transmission. In some examples, the base station 705 may indicate a UE beam configuration including a null TCI state, which may be referred to as a floating TCI state. Based on the null TCI state, the UE 715 may determine the UE 715 is to determine the UE beam configuration for receiving the multicast data signal.

In some examples, the base station 705 may also transmit a configuration identifying a set of candidate UE beam configurations which the UE 715 may adopt to receive and successfully decode the multicast data signal. In some examples, the base station 705 may transmit a configuration identifying resources for the UE 715 to use to receive additional reference signals for determining the UE beam configuration.

In some examples, at 730 the UE 715 may identify the set of candidate UE beam configurations. In some examples, the UE 715 may identify the set based on the configuration received from the base station 705.

At 735, the base station 705 may transmit signaling to the UE 715 during the TxOP to enable the UE 715 to determine the UE beam configuration. In some examples, the signaling may include one or more activity signals from the TRPs participating in the joint transmission. Additionally or alternatively, the signaling may include the additional reference signals (e.g., DMRSs). The UE 715 may receive the additional reference signals in the resources identified by the base station 705.

At 740, the base station 705 may transmit the multicast data signal in the joint transmission from the set of TRPs to the UE 715. In some examples, the multicast data signal may be transmitted after the additional reference signals. In some examples, the multicast data signal may be transmitted in a PDSCH transmission.

At 745, the UE 715 may determine the UE beam configuration for receiving and successfully decoding the multicast data signal based on the signaling from the base station 705. In some examples, the UE 715 may determine a QCL relationship associated with the multicast data signal based on the signaling.

At 750, the UE 715 may decode the multicast data signal based on the signaling from the base station 705. In some examples, the UE may decode the multicast data signal based on the determined QCL relationship. The operations performed by the UE 715 and the base station 705 may therefore support improvements to multicast information transmission and decoding operations and, in some examples, may promote improvements to the reliability of communications between the UE 715 and the base station 705, among other benefits.

Figure 8:
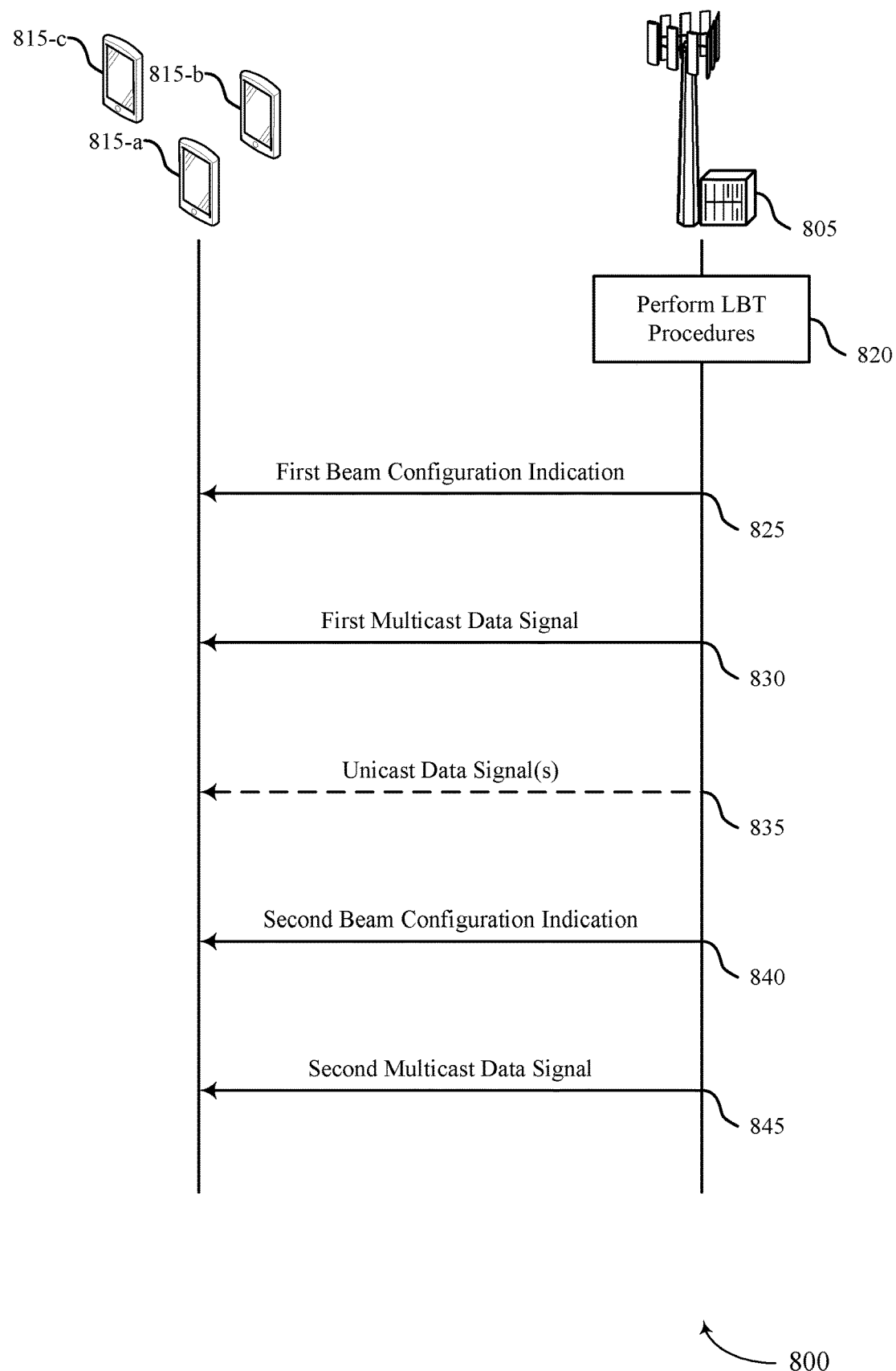

FIG. 8 illustrates an example of a process flow 800 that supports dynamic single frequency network area with listen before talk uncertainty in accordance with aspects of the present disclosure. In some examples, the process flow 800 may implement aspects of wireless communications systems 100 and 200. For example, the process flow 800 may include example operations associated with one or more of a base station 805 or a UE 815, which may be examples of the corresponding devices described with reference to FIGS. 1 and 2. In the following description of the process flow 800, the operations between the base station 805 and the UEs 815 may be performed in a different order than the example order shown, or the operations performed by the base station 805 and the UEs 815 may be performed in different orders or at different times. Some operations may also be omitted from the process flow 800, and other operations may be added to the process flow 800. The operations performed by the base station 805 and the UEs 815 may support improvement to the base station 805 multicast information transmission operations and, in some examples, may promote improvements to multicast data processing for the UEs 815, among other benefits.

At 820, the base station 805 may perform LBT procedures at a set of TRPs to determine which TRPs are available for transmitting a multicast data signal in a joint transmission to the UEs 815 during a first TxOP and a second TxOP (e.g., a first slot and a second slot). Based on the outcome of the LBT procedures, the base station 805 may determine a respective transmission beam configuration for the available TRPs during each TxOP.

At 825, the base station 805 may transmit an indication of a first beam configuration to the UEs 815. In some examples, the indication may be transmitted in a DCI message (e.g., in a PDCCH transmission). In some examples, the first beam configuration may include a first TCI state associated with a first multicast data signal transmitted during the first TxOP. In some examples, the first beam configuration may correspond to a multicast area (e.g., an SFN area, a preconfigured multicast area, etc.), which may not match the TRPs participating in the joint transmission during the first TxOP. In some other examples, the first beam configuration may be based on the TRPs which pass the LBT procedures, and so the first beam configuration may match the TRPs participating in the joint transmission during the first TxOP. Based on the first beam configuration, the UEs 815 may be enabled or configured to determine a QCL relationship associated with the first multicast data signal.

In some examples, the indication may also identify the set of TRPs that are available to transmit a second multicast data signal in a joint transmission during the second TxOP. Based on the identified set of TRPs, the UEs 815 may be enabled to determine a QCL relationship associated with the second multicast data signal.

At 830, the base station 805 may transmit the first multicast data signal to the UEs 815 during the first TxOP. The first multicast data signal may be transmitted from a first TRP, which may be a serving cell for the UEs 815. In some examples, the base station 805 may refrain from transmitting the first multicast data signal from one or more additional TRPs which pass the LBT procedure for the first TxOP, as the UEs 815 may not have a sufficient processing time to determine a QCL relationship for a joint transmission during the first TxOP. In some examples, the base station may transmit the first multicast data signal in a PDSCH transmission.

In some examples, at 835 the base station 805 may transmit one or more unicast data signals to the UEs 815 during the first TxOP. The unicast data signals may be transmitted from the TRPs which pass the LBT procedure for the first TxOP, but did not transmit the first multicast data signal.

At 840, the base station 805 may transmit an indication of a second beam configuration to the UEs 815. The second beam configuration may be associated with the set of TRPs which pass the LBT procedures for the second TxOP. In some examples, the indication may be transmitted in a DCI message (e.g., in a PDCCH transmission). In some examples, the second beam configuration may include a second TCI state associated with second multicast data signal transmitted during the second TxOP.

At 845, the base station 805 may transmit the second multicast data signal to the UEs 815 during the second TxOP. The second multicast data signal may be transmitted in a joint transmission using the set of TRPs which pass the LBT procedures for the second TxOP. The operations performed by the UEs 815 and the base station 805 may therefore support improvements to multicast information transmission and decoding operations and, in some examples, may promote improvements to the reliability of communications between the UEs 815 and the base station 805, among other benefits.

Figure 9:
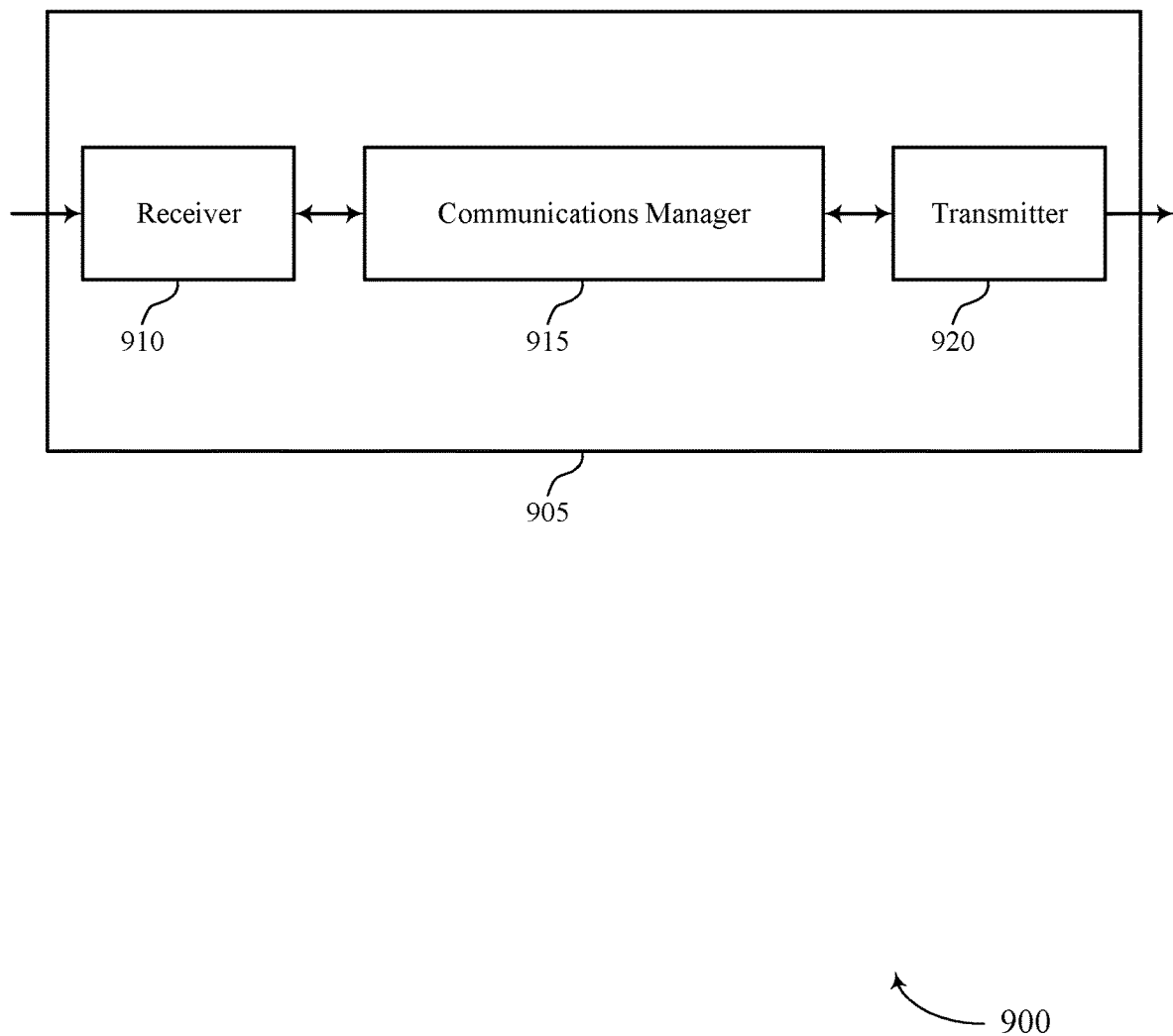
FIGS. 9 and 10 show block diagrams of devices that support dynamic single frequency network area with listen before talk uncertainty in accordance with aspects of the present disclosure.

FIG. 9 shows a block diagram 900 of a device 905 that supports dynamic single frequency network area with listen before talk uncertainty in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic single frequency network area with listen before talk uncertainty, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive an indication that the UE is to determine a UE beam configuration to use to receive, during a slot, a multicast data signal from a set of transmission reception points, receive, during a slot from the set of transmission reception points, the multicast data signal and signaling that is used to determine the UE beam configuration, determine, based on the received indication and the received signaling, the UE beam configuration for the slot, and decode the received multicast data signal based on the determined UE beam configuration.

The communications manager 915 as described herein may be implemented to realize one or more potential advantages. One implementation may allow the device 905 to save power and increase battery life by communicating with a base station 105 (as shown in FIG. 1) more efficiently. For example, the device 905 may efficiently receive multicast information from the base station 105 as the device 905 may be able to determine a UE beam configuration and decode the multicast information more reliably. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
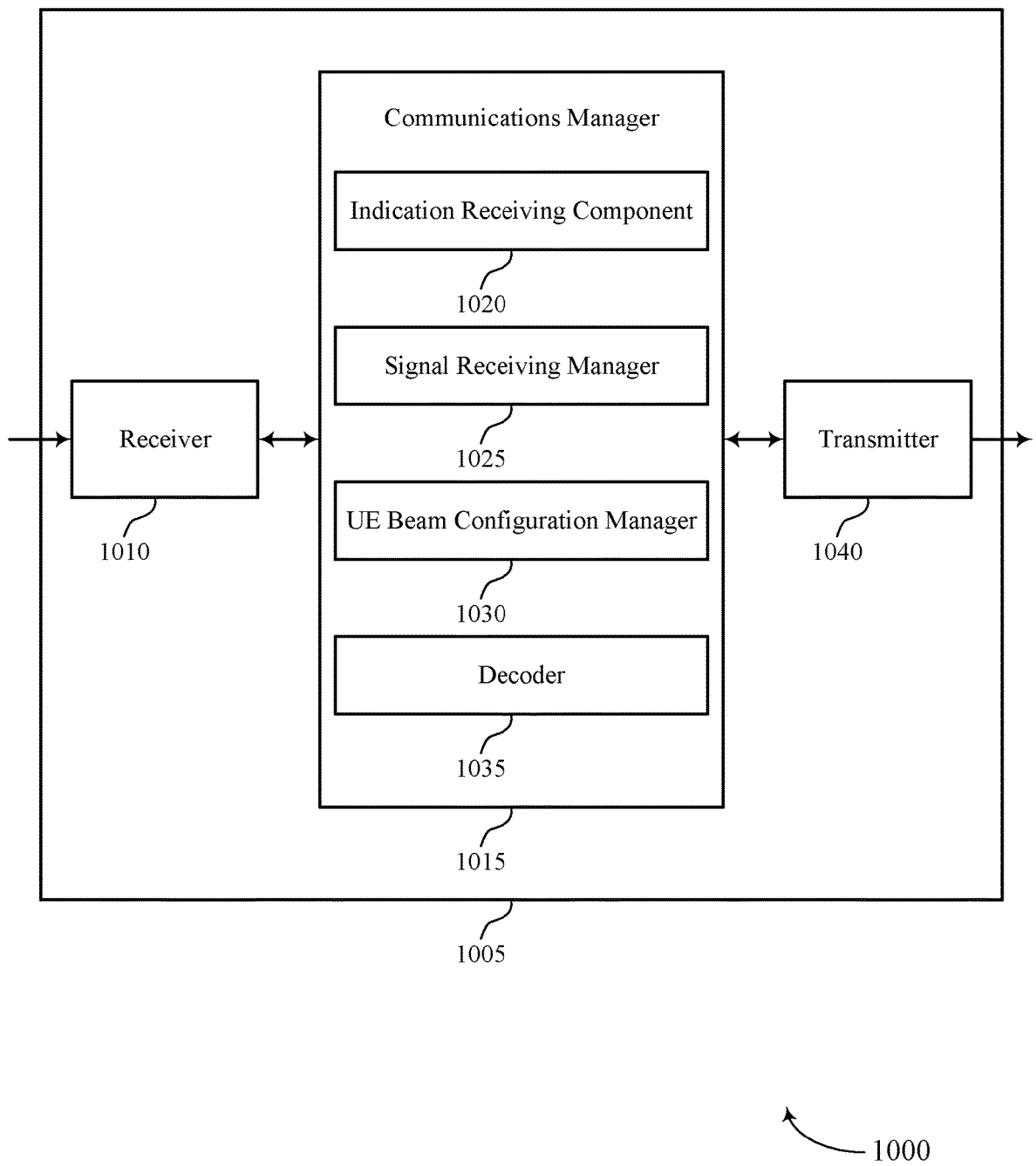

FIG. 10 shows a block diagram 1000 of a device 1005 that supports dynamic single frequency network area with listen before talk uncertainty in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic single frequency network area with listen before talk uncertainty, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an indication receiving component 1020, a signal receiving manager 1025, a UE beam configuration manager 1030, and a decoder 1035. The communications manager 1015 may be an example of aspects of the communications manager 1210 described herein.

The indication receiving component 1020 may receive an indication that the UE is to determine a UE beam configuration to use to receive, during a slot, a multicast data signal from a set of transmission reception points.

The signal receiving manager 1025 may receive, during a slot from the set of transmission reception points, the multicast data signal and signaling that is used to determine the UE beam configuration.

The UE beam configuration manager 1030 may determine, based on the received indication and the received signaling, the UE beam configuration for the slot.

The decoder 1035 may decode the received multicast data signal based on the determined UE beam configuration.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
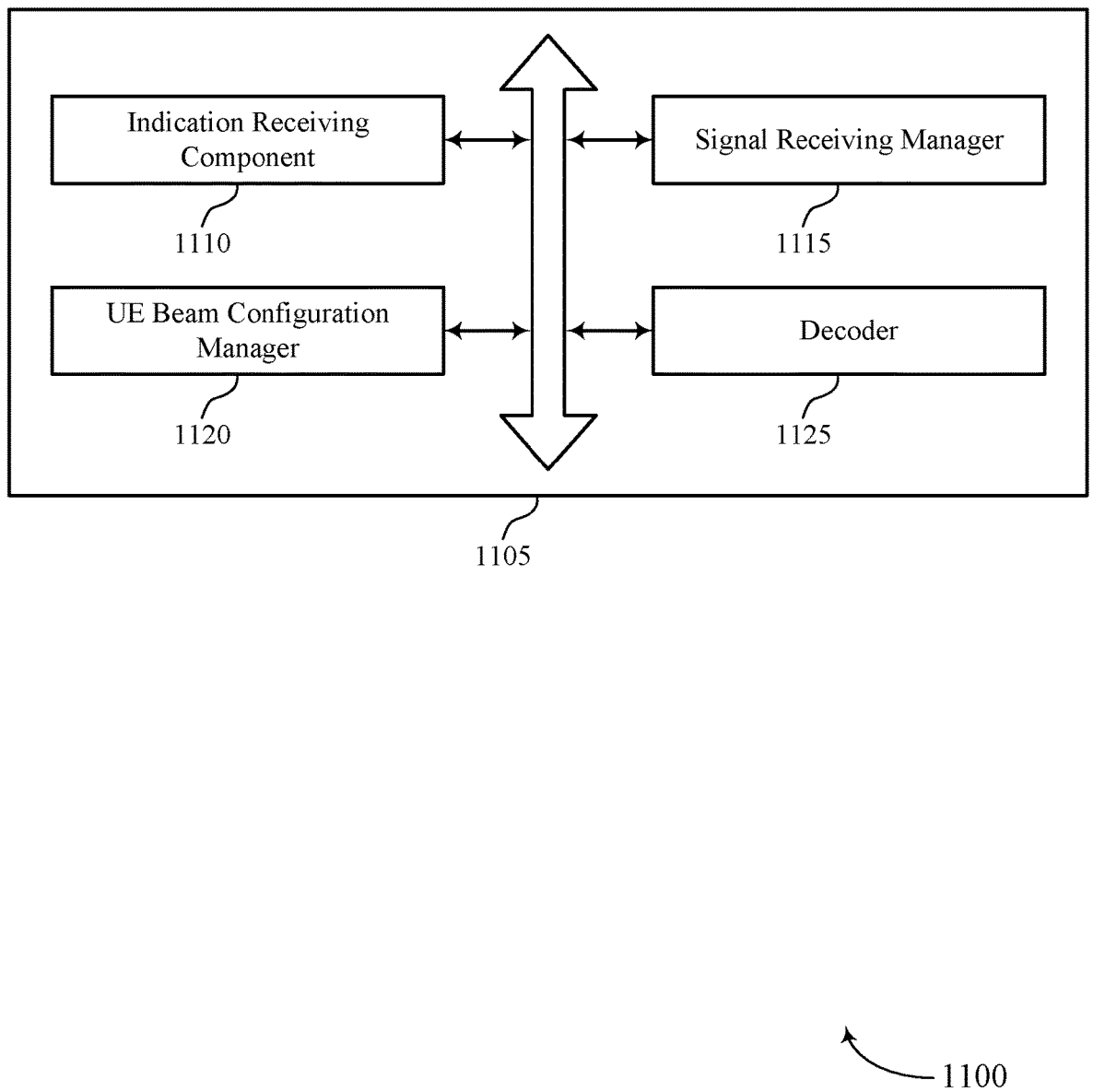
FIG. 11 shows a block diagram of a communications manager that supports dynamic single frequency network area with listen before talk uncertainty in accordance with aspects of the present disclosure.

FIG. 11 shows a block diagram 1100 of a communications manager 1105 that supports dynamic single frequency network area with listen before talk uncertainty in accordance with aspects of the present disclosure. The communications manager 1105 may be an example of aspects of a communications manager 915, a communications manager 1015, or a communications manager 1210 described herein. The communications manager 1105 may include an indication receiving component 1110, a signal receiving manager 1115, a UE beam configuration manager 1120, and a decoder 1125. Each of these modules may communicate, directly or indirectly, with one another (e.g., via one or more buses).

The indication receiving component 1110 may receive an indication that the UE is to determine a UE beam configuration to use to receive, during a slot, a multicast data signal from a set of transmission reception points. In some examples, the indication receiving component 1110 may identify, based on the received indication, a presence of additional reference signals from the set transmission reception points. In some examples, the indication receiving component 1110 may receive a configuration identifying resources for the UE to use to receive the additional reference signals. In some cases, the indication is received in a control channel transmission.

The signal receiving manager 1115 may receive, during a slot from the set of transmission reception points, the multicast data signal and signaling that is used to determine the UE beam configuration. In some examples, the signal receiving manager 1115 may determine that the multicast data signal is from the set of transmission reception points based on the received signaling that is used to determine the UE beam configuration. In some examples, the signal receiving manager 1115 may receive the additional reference signals in the slot based on the identifying, where the UE beam configuration for the slot is determined based on the received additional reference signals.

In some cases, the received signaling includes a set of activity signals, each activity signal of the set of activity signals corresponding to one of the set of transmission reception points. In some examples, the additional reference signals include demodulation reference signals. In some cases, the additional reference signals are received in a first one or more symbol periods of the slot that precede a second one or more symbol periods of the slot associated with the received multicast data signal. In some aspects, the multicast data signal is received on a downlink shared channel.

The UE beam configuration manager 1120 may determine, based on the received indication and the received signaling, the UE beam configuration for the slot. In some examples, the UE beam configuration manager 1120 may identify a set of candidate beam configurations associated with the set of transmission reception points, where the UE beam configuration for the slot is determined based on a combination of the identified set of candidate beam configurations. In some cases, the UE beam configuration manager 1120 may receive a configuration identifying the set of candidate beam configurations, each candidate beam configuration of the set of candidate beam configurations associated with a transmission reception point of the set of transmission reception points. In some cases, the UE beam configuration includes a transmission configuration indication state.

The decoder 1125 may decode the received multicast data signal based on the determined UE beam configuration. In some examples, the decoder 1125 may determine a quasi co-location relationship associated with the received multicast data signal based on the received signaling, where the received multicast data signal is decoded based on the determined quasi co-location relationship.

Figure 12:
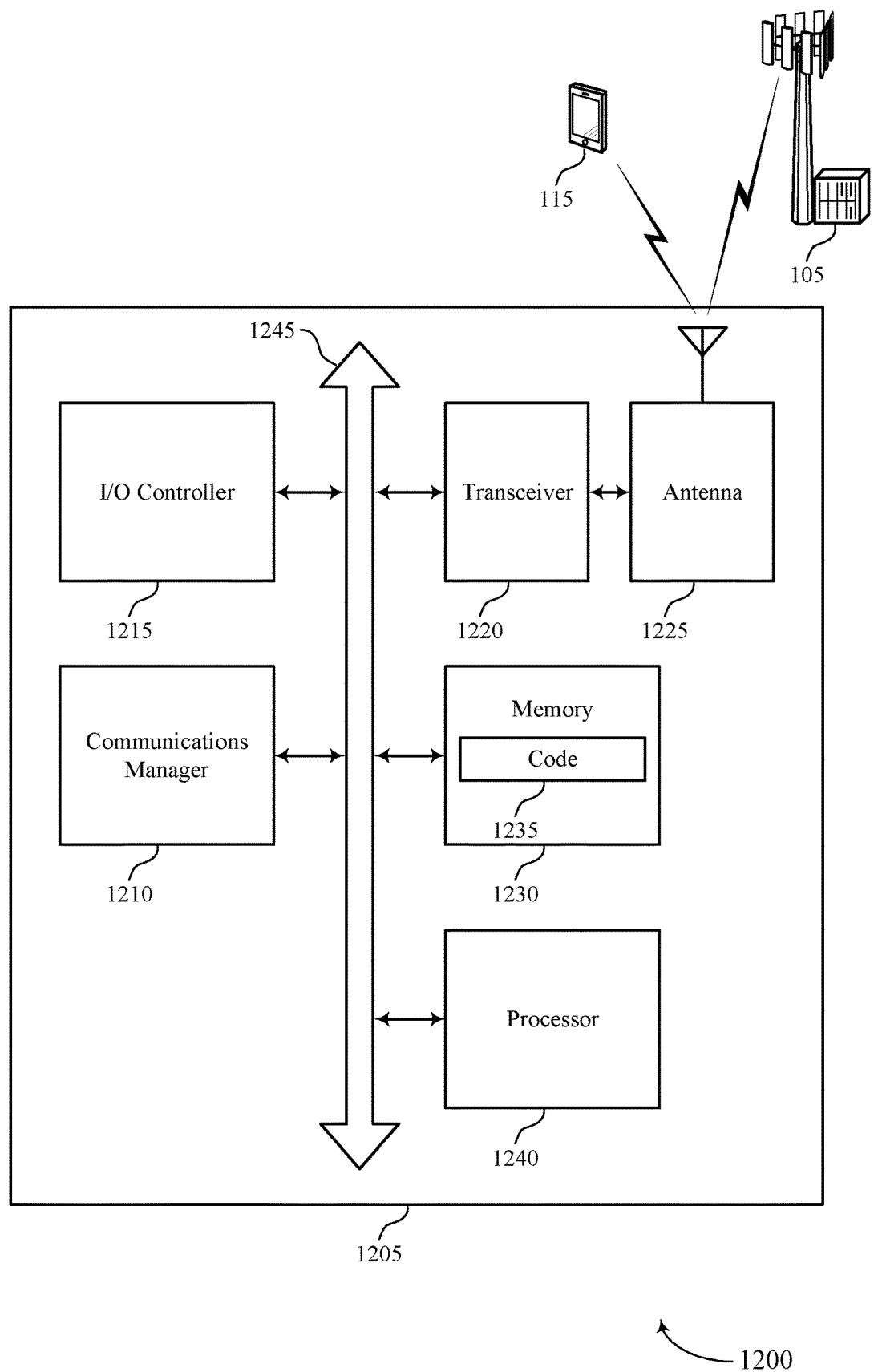
FIG. 12 shows a diagram of a system including a device that supports dynamic single frequency network area with listen before talk uncertainty in accordance with aspects of the present disclosure.

FIG. 12 shows a diagram of a system 1200 including a device 1205 that supports dynamic single frequency network area with listen before talk uncertainty in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive an indication that the UE is to determine a UE beam configuration to use to receive, during a slot, a multicast data signal from a set of transmission reception points, receive, during a slot from the set of transmission reception points, the multicast data signal and signaling that is used to determine the UE beam configuration, determine, based on the received indication and the received signaling, the UE beam configuration for the slot, and decode the received multicast data signal based on the determined UE beam configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic single frequency network area with listen before talk uncertainty).

The processor 1240 of the device 1205 (e.g., controlling the receiver 910, the transmitter 920, or the transceiver 1220) may reduce power consumption and increase communications efficiency based on determining the UE beam configuration and decoding multicast information. In some examples, the processor 1240 of the device 1205 may reconfigure parameters for decoding the multicast information. For example, the processor 1240 of the device 1205 may turn on one or more processing units for determining the UE beam configuration or a QCL relationship, increase a processing clock, or a similar mechanism within the device 1205. As such, when subsequent multicast information transmissions are received, the processor 1240 may be ready to respond more efficiently through the reduction of a ramp up in processing power. The improvements in power saving and multicast information reception efficiency may further increase battery life at the device 1205.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
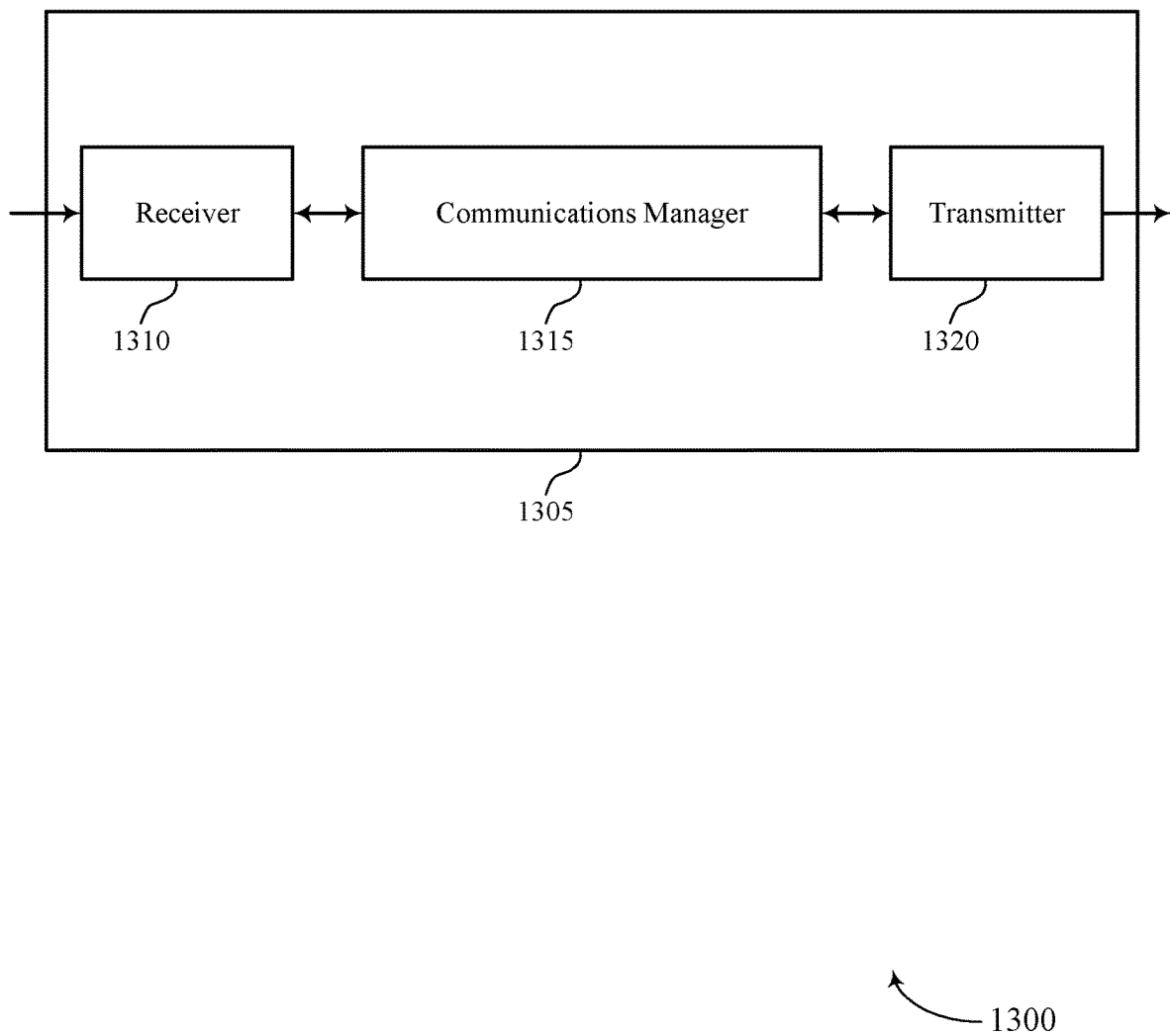
FIGS. 13 and 14 show block diagrams of devices that support dynamic single frequency network area with listen before talk uncertainty in accordance with aspects of the present disclosure.

FIG. 13 shows a block diagram 1300 of a device 1305 that supports dynamic single frequency network area with listen before talk uncertainty in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic single frequency network area with listen before talk uncertainty, etc.). Information may be passed on to other components of the device 1305. The receiver 1310 may be an example of aspects of the transceiver 1620 described with reference to FIG. 16. The receiver 1310 may utilize a single antenna or a set of antennas.

In some examples, the communications manager 1315 may perform a listen before talk procedure to determine that a set of transmission reception points are available during a slot to transmit a multicast data signal to a UE, transmit, to the UE, an indication that the UE is to determine a UE beam configuration to use to receive, during the slot, the multicast data signal from the set of transmission reception points, and transmit, during the slot from the set of transmission reception points, the multicast data signal and signaling that is to be used by the UE to determine the UE beam configuration.

In some examples, the communications manager 1315 may perform a listen before talk procedure to determine that a set of transmission reception points are available during a first slot and a second slot to transmit a first multicast data signal for a set of UEs and transmit, to the set of UEs based on a result of the performed listen before talk procedure, an indication of a first beam configuration for one or more of the set of transmission reception points. In some examples, the communications manager 1315 may transmit, to the set of UEs based on the result of the performed listen before talk procedure, an indication of a second beam configuration for the set of transmission reception points that are available to transmit the first multicast data signal to the set of UEs, transmit, during the first slot according to the first beam configuration, the first multicast data signal to the set of UEs using a first transmission reception point of the set of transmission reception points, and transmit, during the second slot according to the second beam configuration for the set of transmission reception points, a second multicast data signal to the set of UEs using the set of transmission reception points.

The communications manager 1315 as described herein may be implemented to realize one or more potential advantages. One implementation may allow the device 1305 to save power by communicating with a UE 115 (as shown in FIG. 1) more efficiently. For example, the device 1305 may improve reliability in communications with a UE 115, as the device 1305 may be able to increase a likelihood that the UE 115 may receive multicast information in a dynamic multicast area. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
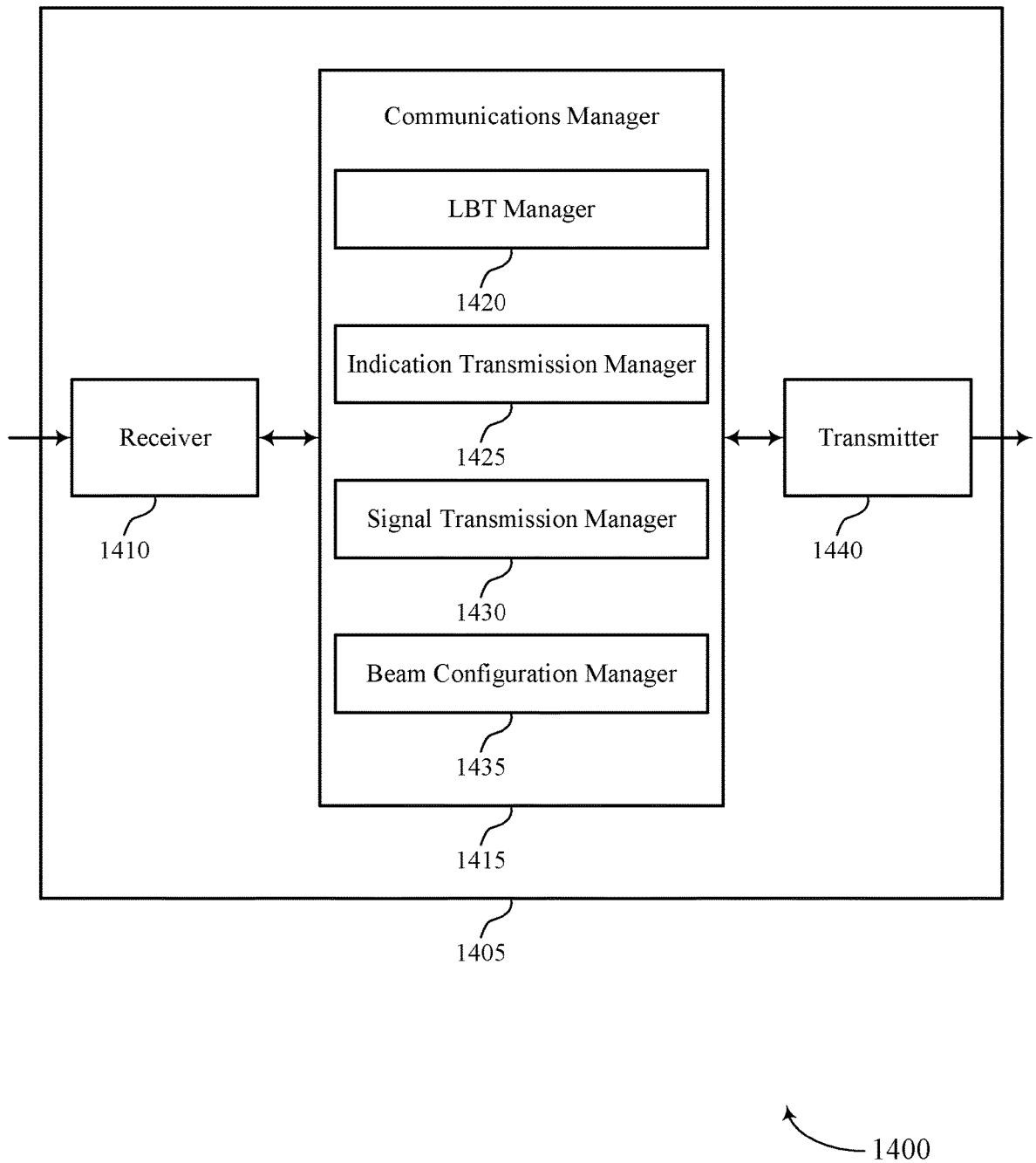

FIG. 14 shows a block diagram 1400 of a device 1405 that supports dynamic single frequency network area with listen before talk uncertainty in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to dynamic single frequency network area with listen before talk uncertainty, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include an LBT manager 1420, an indication transmission manager 1425, a signal transmission manager 1430, and a beam configuration manager 1435. The communications manager 1415 may be an example of aspects of the communications manager 1610 described herein.

In some examples, the LBT manager 1420 may perform a listen before talk procedure to determine that a set of transmission reception points are available during a slot to transmit a multicast data signal to a UE. The indication transmission manager 1425 may transmit, to the UE, an indication that the UE is to determine a UE beam configuration to use to receive, during the slot, the multicast data signal from the set of transmission reception points. The signal transmission manager 1430 may transmit, during the slot from the set of transmission reception points, the multicast data signal and signaling that is to be used by the UE to determine the UE beam configuration.

In some examples, the LBT manager 1420 may perform a listen before talk procedure to determine that a set of transmission reception points are available during a first slot and a second slot to transmit a first multicast data signal for a set of UEs. The beam configuration manager 1435 may transmit, to the set of UEs based on a result of the performed listen before talk procedure, an indication of a first beam configuration for one or more of the set of transmission reception points. The signal transmission manager 1430 may transmit, during the first slot according to the first beam configuration, the first multicast data signal to the set of UEs using a first transmission reception point of the set of transmission reception points. The beam configuration manager 1435 may transmit, to the set of UEs based on the result of the performed listen before talk procedure, an indication of a second beam configuration for the set of transmission reception points that are available to transmit the first multicast data signal to the set of UEs. The signal transmission manager 1430 may transmit, during the second slot according to the second beam configuration for the set of transmission reception points, a second multicast data signal to the set of UEs using the set of transmission reception points.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
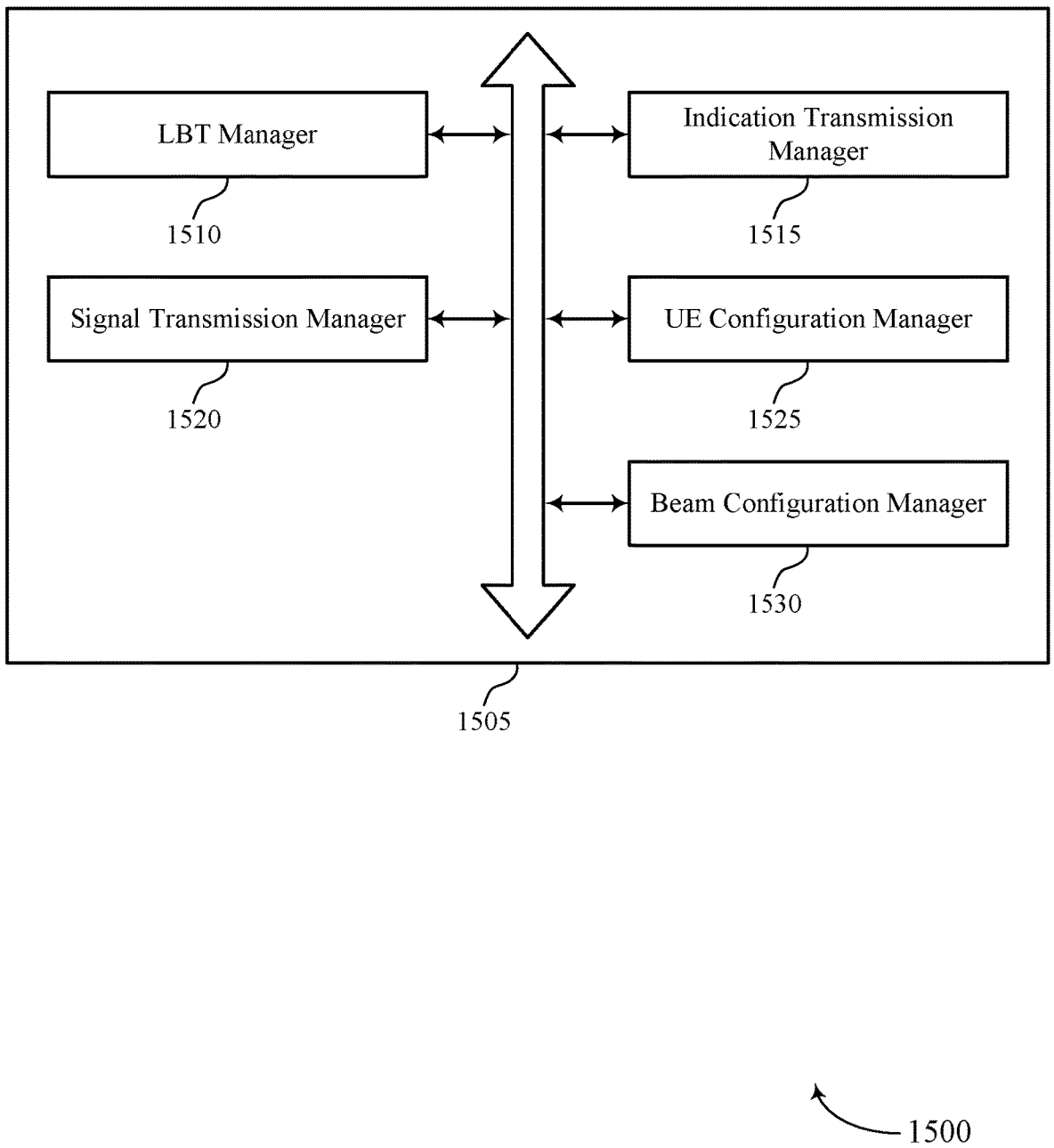
FIG. 15 shows a block diagram of a communications manager that supports dynamic single frequency network area with listen before talk uncertainty in accordance with aspects of the present disclosure.

FIG. 15 shows a block diagram 1500 of a communications manager 1505 that supports dynamic single frequency network area with listen before talk uncertainty in accordance with aspects of the present disclosure. The communications manager 1505 may be an example of aspects of a communications manager 1315, a communications manager 1415, or a communications manager 1610 described herein. The communications manager 1505 may include an LBT manager 1510, an indication transmission manager 1515, a signal transmission manager 1520, a UE configuration manager 1525, a UE beam configuration manager 1530, and a beam configuration manager 1535. Each of these modules may communicate, directly or indirectly, with one another (e.g., via one or more buses).

In some examples, the LBT manager 1510 may perform a listen before talk procedure to determine that a set of transmission reception points are available during a slot to transmit a multicast data signal to a UE.

In some examples, the indication transmission manager 1515 may transmit, to the UE, an indication that the UE is to determine a UE beam configuration to use to receive, during the slot, the multicast data signal from the set of transmission reception points. In some cases, the indication is transmitted in a control channel transmission.

In some examples, the signal transmission manager 1520 may transmit, during the slot from the set of transmission reception points, the multicast data signal and signaling that is to be used by the UE to determine the UE beam configuration. In some cases, the transmitted signaling includes a set of activity signals, each activity signal of the set of activity signals corresponding to one of the set of transmission reception points.

In some examples, the signal transmission manager 1520 may transmit the additional reference signals in the slot based on the transmitted indication, where the transmitted signaling includes the additional reference signals. In some examples, the additional reference signals include demodulation reference signals. In some cases, the additional reference signals are transmitted in a first one or more symbol periods of the slot that precede a second one or more symbol periods of the slot associated with the transmitted multicast data signal. In some aspects, the multicast data signal is transmitted on a downlink shared channel transmission.

In some examples, the UE configuration manager 1525 may transmit a configuration identifying a set of candidate beam configurations for the UE to use to determine the UE beam configuration, each candidate beam configuration of the set of candidate beam configurations associated with a transmission reception point of the set of transmission reception points. In some examples, the UE configuration manager 1525 may transmit a configuration identifying resources for the UE to use to receive additional reference signals from the set of transmission reception points. In some cases, the UE beam configuration includes a transmission configuration indication state.

In some examples, the LBT manager 1510 may perform a listen before talk procedure to determine that a set of transmission reception points are available during a first slot and a second slot to transmit a first multicast data signal for a set of UEs.

In some examples, the signal transmission manager 1520 may transmit, during the first slot according to the first beam configuration, the first multicast data signal to the set of UEs using a first transmission reception point of the set of transmission reception points. In some cases, the signal transmission manager 1520 may transmit, during the second slot according to the second beam configuration for the set of transmission reception points, a second multicast data signal to the set of UEs using the set of transmission reception points.

In some examples, the signal transmission manager 1520 may determine to transmit, during the first slot, unicast data signals using a remaining one or more transmission reception points of the set of transmission reception points. In some cases, the signal transmission manager 1520 may refrain from transmitting, during the first slot based on the result of the performed listen before talk procedure, the first multicast data signal to the set of UEs using a remaining one or more transmission reception points of the set of transmission reception points. In some examples, the signal transmission manager 1520 may refrain from transmitting, during the first slot based on the result of the performed listen before talk procedure, on a remaining one or more transmission reception points of the set of transmission reception points.

The beam configuration manager 1530 may transmit, to the set of UEs based on a result of the performed listen before talk procedure, an indication of a first beam configuration for one or more of the set of transmission reception points. In some examples, the beam configuration manager 1530 may transmit, to the set of UEs based on the result of the performed listen before talk procedure, an indication of a second beam configuration for the set of transmission reception points that are available to transmit the first multicast data signal to the set of UEs.

In some cases, the first transmission reception point includes the one or more of the set of transmission reception points, and the first beam configuration is for the first transmission reception point. In some aspects, the first transmission reception point includes a serving cell for the set of UEs, and the remaining one or more transmission reception points include non-serving cells for the set of UEs. In some cases, the first beam configuration is consistent with the transmission reception points that pass the performed listen before talk procedure for the first slot, and the second beam configuration is consistent with the transmission reception points that pass the performed listen before talk procedure for the second slot.

In some cases, the one or more of the set of transmission reception points include the set of transmission reception points, and the first beam configuration is for the set of transmission reception points. In some examples, the first beam configuration is inconsistent with the transmission reception points that pass the performed listen before talk procedure for the first slot, and the second beam configuration is consistent with the transmission reception points that pass the performed listen before talk procedure for the second slot. In some cases, the indication of the first beam configuration is transmitted in a first downlink control information message in the first slot. In some cases, the indication of the second beam configuration is transmitted in a second downlink control information message in the second slot.

In some cases, the first beam configuration includes a first transmission configuration indication state. In some cases, the second beam configuration includes a second transmission configuration indication state.

Figure 16:
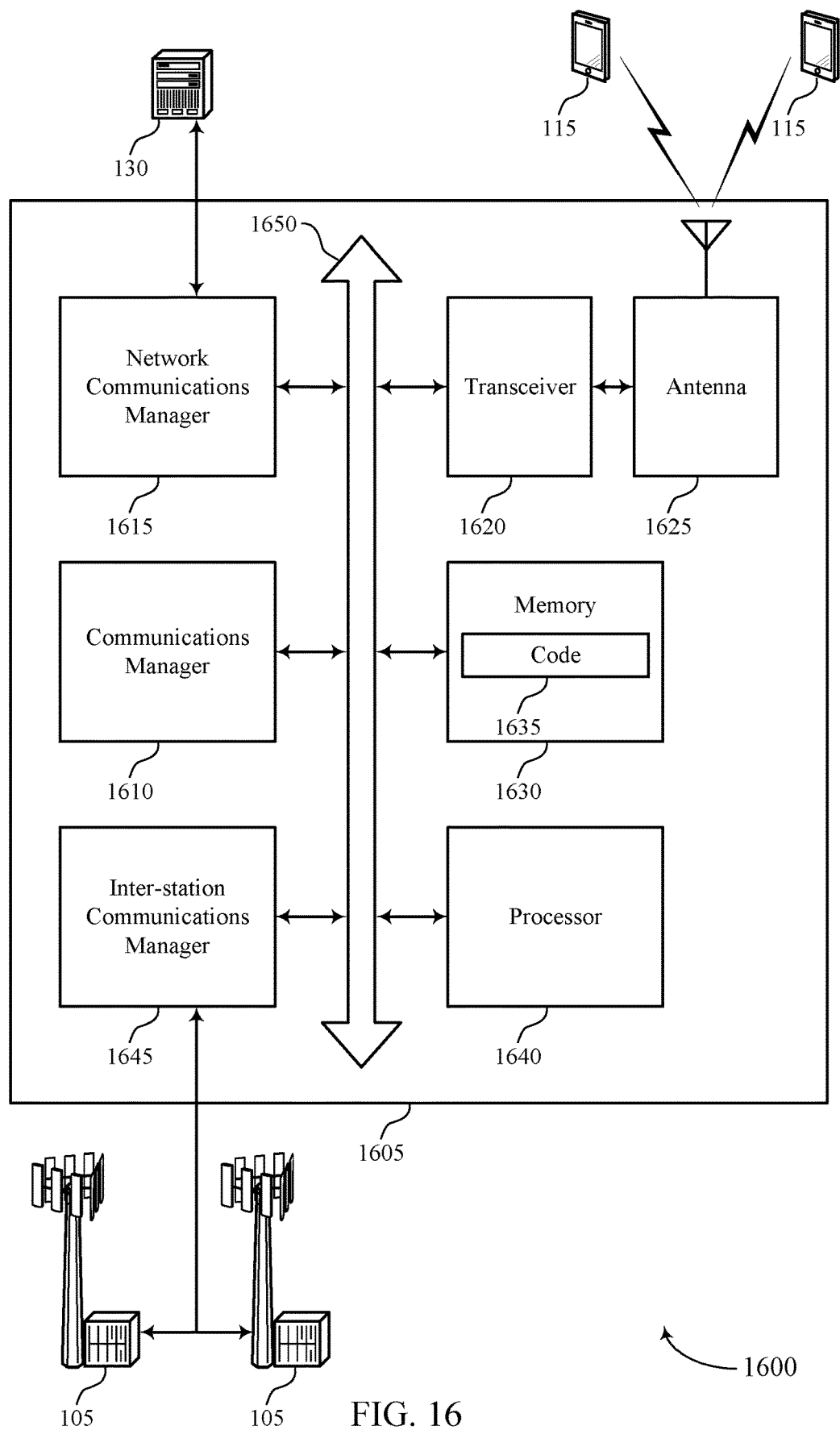
FIG. 16 shows a diagram of a system including a device that supports dynamic single frequency network area with listen before talk uncertainty in accordance with aspects of the present disclosure.

FIG. 16 shows a diagram of a system 1600 including a device 1605 that supports dynamic single frequency network area with listen before talk uncertainty in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

In some examples, the communications manager 1610 may perform a listen before talk procedure to determine that a set of transmission reception points are available during a slot to transmit a multicast data signal to a UE, transmit, to the UE, an indication that the UE is to determine a UE beam configuration to use to receive, during the slot, the multicast data signal from the set of transmission reception points, and transmit, during the slot from the set of transmission reception points, the multicast data signal and signaling that is to be used by the UE to determine the UE beam configuration.

In some examples, the communications manager 1610 may perform a listen before talk procedure to determine that a set of transmission reception points are available during a first slot and a second slot to transmit a first multicast data signal for a set of UEs and transmit, to the set of UEs based on a result of the performed listen before talk procedure, an indication of a first beam configuration for one or more of the set of transmission reception points. In some examples, the communications manager 1610 may transmit, to the set of UEs based on the result of the performed listen before talk procedure, an indication of a second beam configuration for the set of transmission reception points that are available to transmit the first multicast data signal to the set of UEs, transmit, during the first slot according to the first beam configuration, the first multicast data signal to the set of UEs using a first transmission reception point of the set of transmission reception points, and transmit, during the second slot according to the second beam configuration for the set of transmission reception points, a second multicast data signal to the set of UEs using the set of transmission reception points.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting dynamic single frequency network area with listen before talk uncertainty).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
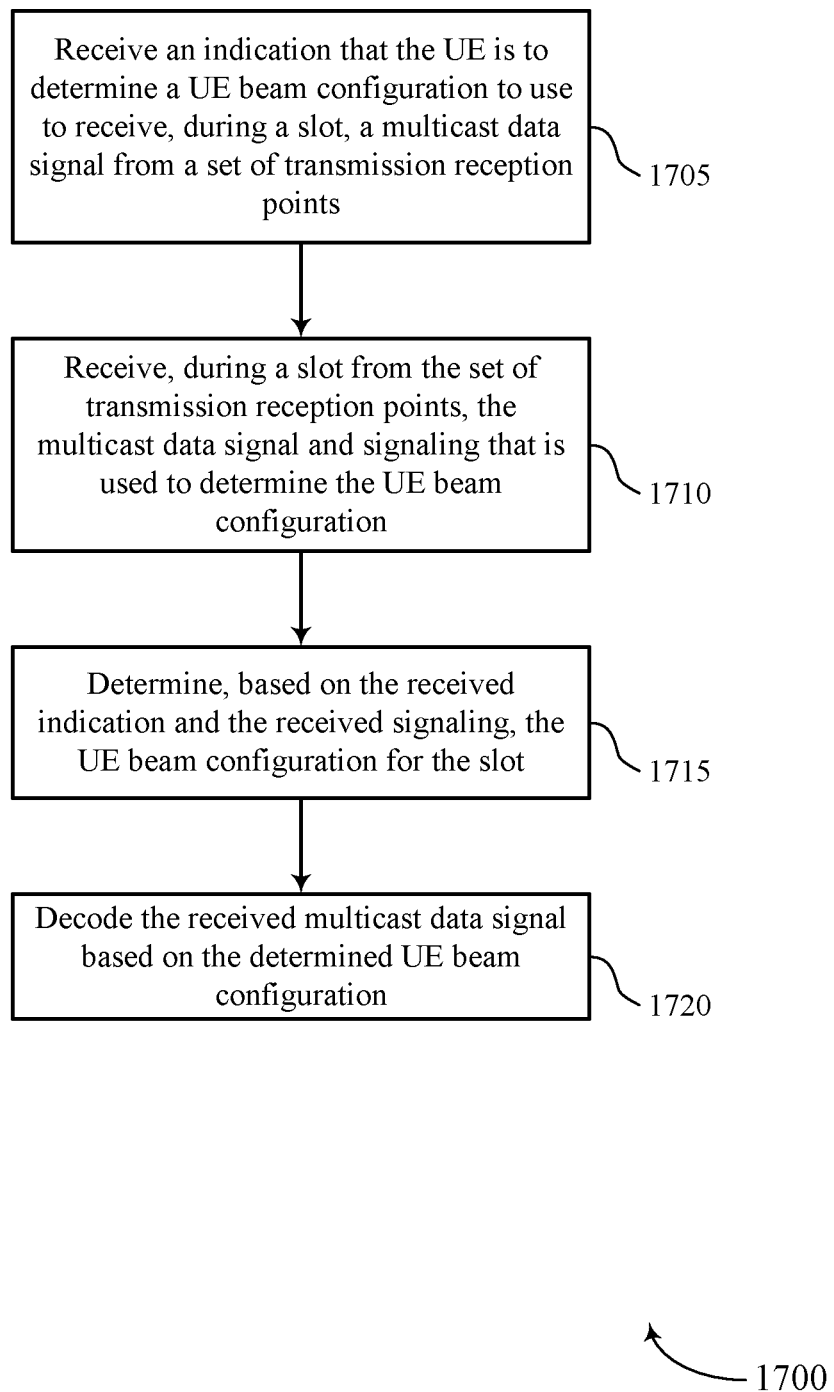
FIGS. 17 through 24 show flowcharts illustrating methods that support dynamic single frequency network area with listen before talk uncertainty in accordance with aspects of the present disclosure.

FIG. 17 shows a flowchart illustrating a method 1700 that supports dynamic single frequency network area with listen before talk uncertainty in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE may receive an indication that the UE is to determine a UE beam configuration to use to receive, during a slot, a multicast data signal from a set of transmission reception points. The operations of 1705 may be performed according to the methods described herein. In some examples, aspects of the operations of 1705 may be performed by an indication receiving component as described with reference to FIGS. 9 through 12.

At 1710, the UE may receive, during a slot from the set of transmission reception points, the multicast data signal and signaling that is used to determine the UE beam configuration. The operations of 1710 may be performed according to the methods described herein. In some examples, aspects of the operations of 1710 may be performed by a signal receiving manager as described with reference to FIGS. 9 through 12.

At 1715, the UE may determine, based on the received indication and the received signaling, the UE beam configuration for the slot. The operations of 1715 may be performed according to the methods described herein. In some examples, aspects of the operations of 1715 may be performed by a UE beam configuration manager as described with reference to FIGS. 9 through 12.

At 1720, the UE may decode the received multicast data signal based on the determined UE beam configuration. The operations of 1720 may be performed according to the methods described herein. In some examples, aspects of the operations of 1720 may be performed by a decoder as described with reference to FIGS. 9 through 12.

Figure 18:
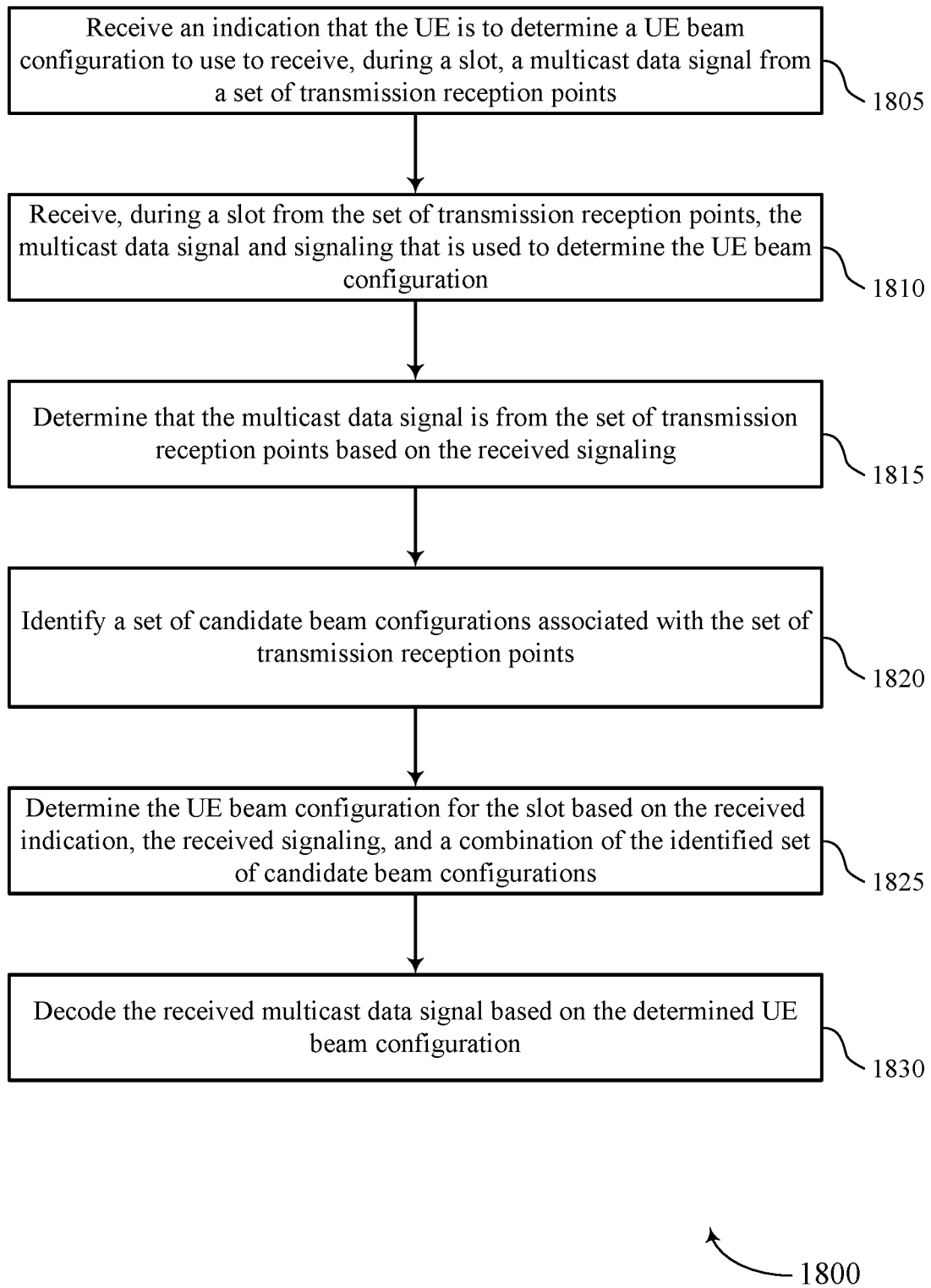

FIG. 18 shows a flowchart illustrating a method 1800 that supports dynamic single frequency network area with listen before talk uncertainty in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may receive an indication that the UE is to determine a UE beam configuration to use to receive, during a slot, a multicast data signal from a set of transmission reception points. The operations of 1805 may be performed according to the methods described herein. In some examples, aspects of the operations of 1805 may be performed by an indication receiving component as described with reference to FIGS. 9 through 12.

At 1810, the UE may receive, during a slot from the set of transmission reception points, the multicast data signal and signaling that is used to determine the UE beam configuration. The operations of 1810 may be performed according to the methods described herein. In some examples, aspects of the operations of 1810 may be performed by a signal receiving manager as described with reference to FIGS. 9 through 12.

At 1815, the UE may determine that the multicast data signal is from the set of transmission reception points based on the received signaling. The operations of 1815 may be performed according to the methods described herein. In some examples, aspects of the operations of 1815 may be performed by a signal receiving manager as described with reference to FIGS. 9 through 12.

At 1820, the UE may identify a set of candidate beam configurations associated with the set of transmission reception points, where the UE beam configuration for the slot is determined based on a combination of the identified set of candidate beam configurations. The operations of 1820 may be performed according to the methods described herein. In some examples, aspects of the operations of 1820 may be performed by a UE beam configuration manager as described with reference to FIGS. 9 through 12.

At 1825, the UE may determine the UE beam configuration for the slot based on the received indication, the received signaling, and a combination of the identified set of candidate beam configurations. The operations of 1825 may be performed according to the methods described herein. In some examples, aspects of the operations of 1825 may be performed by a UE beam configuration manager as described with reference to FIGS. 9 through 12.

At 1830, the UE may decode the received multicast data signal based on the determined UE beam configuration. The operations of 1830 may be performed according to the methods described herein. In some examples, aspects of the operations of 1830 may be performed by a decoder as described with reference to FIGS. 9 through 12.

Figure 19:
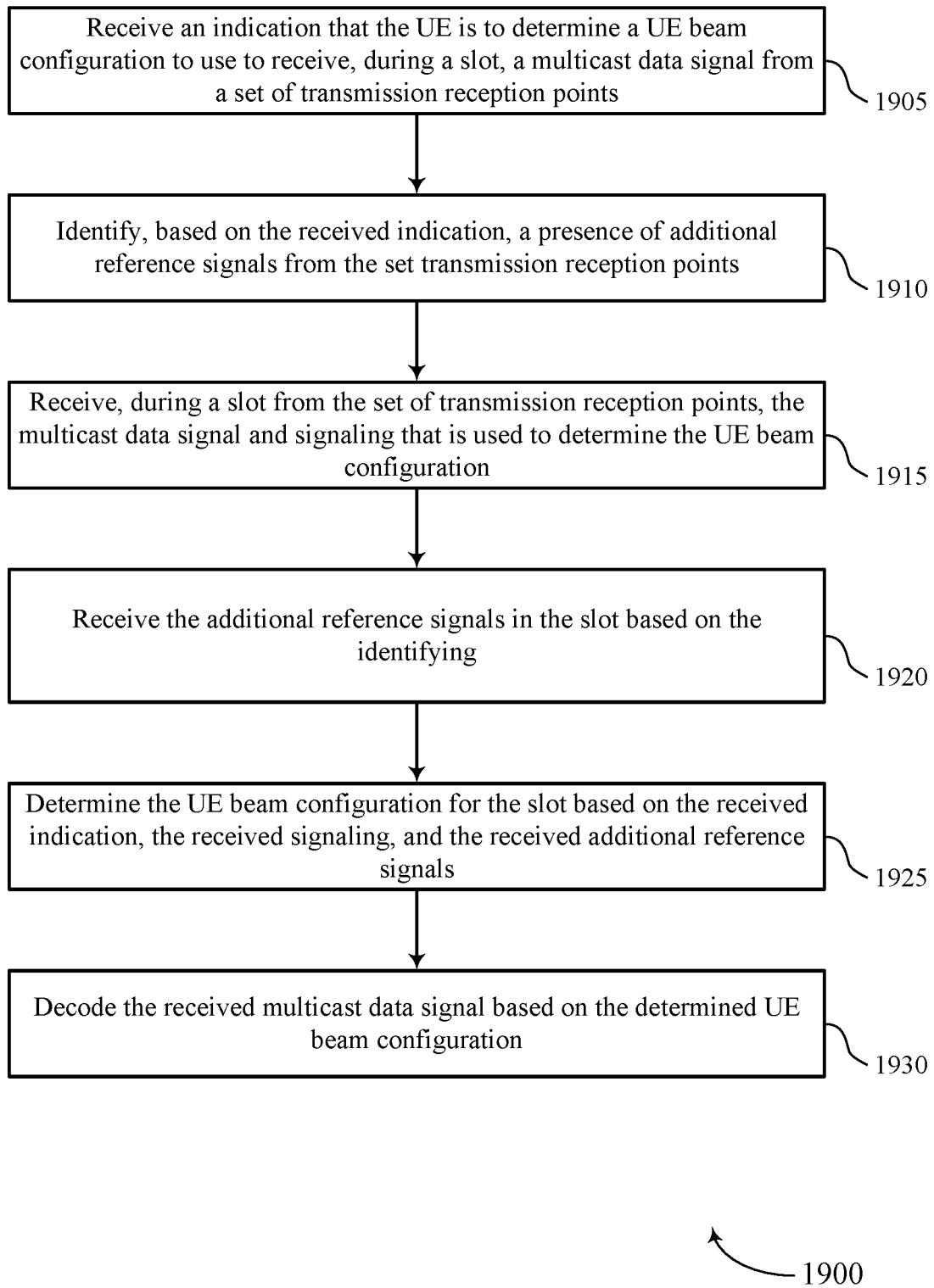

FIG. 19 shows a flowchart illustrating a method 1900 that supports dynamic single frequency network area with listen before talk uncertainty in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1905, the UE may receive an indication that the UE is to determine a UE beam configuration to use to receive, during a slot, a multicast data signal from a set of transmission reception points. The operations of 1905 may be performed according to the methods described herein. In some examples, aspects of the operations of 1905 may be performed by an indication receiving component as described with reference to FIGS. 9 through 12.

At 1910, the UE may identify, based on the received indication, a presence of additional reference signals from the set transmission reception points. The operations of 1910 may be performed according to the methods described herein. In some examples, aspects of the operations of 1910 may be performed by an indication receiving component as described with reference to FIGS. 9 through 12.

At 1915, the UE may receive, during a slot from the set of transmission reception points, the multicast data signal and signaling that is used to determine the UE beam configuration. The operations of 1915 may be performed according to the methods described herein. In some examples, aspects of the operations of 1915 may be performed by a signal receiving manager as described with reference to FIGS. 9 through 12.

At 1920, the UE may receive the additional reference signals in the slot based on the identifying. The operations of 1920 may be performed according to the methods described herein. In some examples, aspects of the operations of 1920 may be performed by a signal receiving manager as described with reference to FIGS. 9 through 12.

At 1925, the UE may determine the UE beam configuration for the slot based on the received indication, the received signaling, and the received additional reference signals. The operations of 1925 may be performed according to the methods described herein. In some examples, aspects of the operations of 1925 may be performed by a UE beam configuration manager as described with reference to FIGS. 9 through 12.

At 1930, the UE may decode the received multicast data signal based on the determined UE beam configuration. The operations of 1930 may be performed according to the methods described herein. In some examples, aspects of the operations of 1930 may be performed by a decoder as described with reference to FIGS. 9 through 12.

Figure 20:
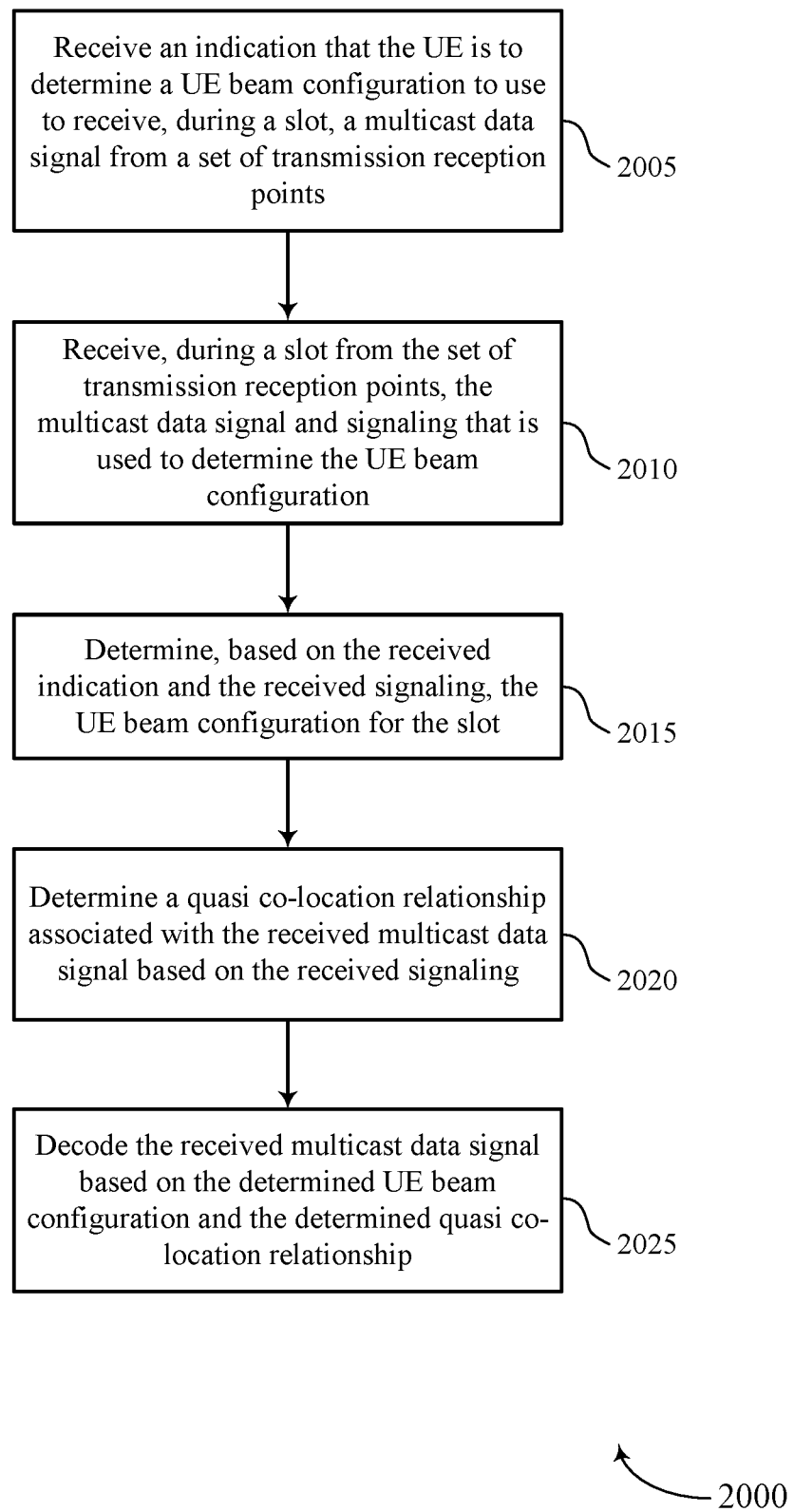

FIG. 20 shows a flowchart illustrating a method 2000 that supports dynamic single frequency network area with listen before talk uncertainty in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2005, the UE may receive an indication that the UE is to determine a UE beam configuration to use to receive, during a slot, a multicast data signal from a set of transmission reception points. The operations of 2005 may be performed according to the methods described herein. In some examples, aspects of the operations of 2005 may be performed by an indication receiving component as described with reference to FIGS. 9 through 12.

At 2010, the UE may receive, during a slot from the set of transmission reception points, the multicast data signal and signaling that is used to determine the UE beam configuration. The operations of 2010 may be performed according to the methods described herein. In some examples, aspects of the operations of 2010 may be performed by a signal receiving manager as described with reference to FIGS. 9 through 12.

At 2015, the UE may determine, based on the received indication and the received signaling, the UE beam configuration for the slot. The operations of 2015 may be performed according to the methods described herein. In some examples, aspects of the operations of 2015 may be performed by a UE beam configuration manager as described with reference to FIGS. 9 through 12.

At 2020, the UE may determine a quasi co-location relationship associated with the received multicast data signal based on the received signaling. The operations of 2020 may be performed according to the methods described herein. In some examples, aspects of the operations of 2020 may be performed by a decoder as described with reference to FIGS. 9 through 12.

At 2025, the UE may decode the received multicast data signal based on the determined UE beam configuration and the determined quasi co-location relationship. The operations of 2025 may be performed according to the methods described herein. In some examples, aspects of the operations of 2025 may be performed by a decoder as described with reference to FIGS. 9 through 12.

Figure 21:
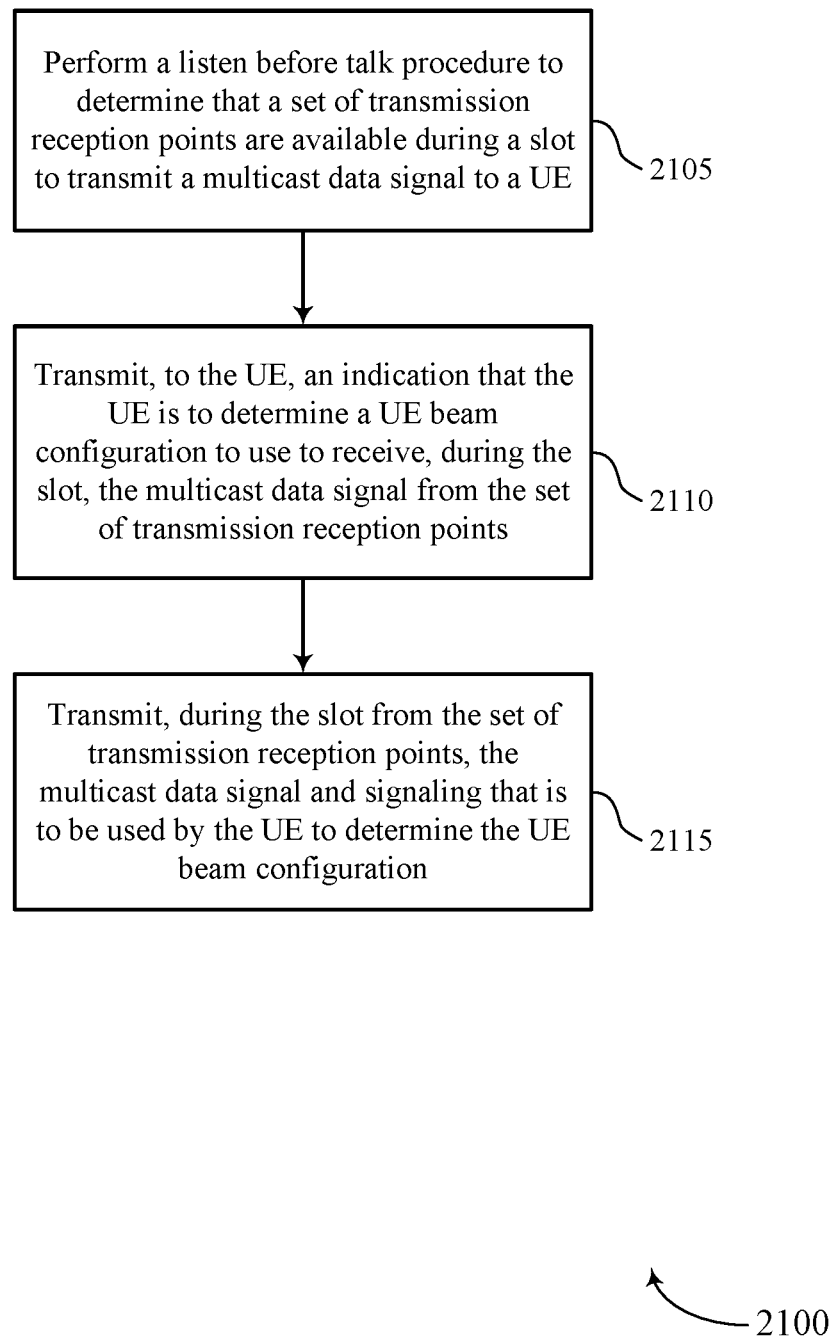

FIG. 21 shows a flowchart illustrating a method 2100 that supports dynamic single frequency network area with listen before talk uncertainty in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2105, the base station may perform a listen before talk procedure to determine that a set of transmission reception points are available during a slot to transmit a multicast data signal to a UE. The operations of 2105 may be performed according to the methods described herein. In some examples, aspects of the operations of 2105 may be performed by a LBT manager as described with reference to FIGS. 13 through 16.

At 2110, the base station may transmit, to the UE, an indication that the UE is to determine a UE beam configuration to use to receive, during the slot, the multicast data signal from the set of transmission reception points. The operations of 2110 may be performed according to the methods described herein. In some examples, aspects of the operations of 2110 may be performed by an indication transmission manager as described with reference to FIGS. 13 through 16.

At 2115, the base station may transmit, during the slot from the set of transmission reception points, the multicast data signal and signaling that is to be used by the UE to determine the UE beam configuration. The operations of 2115 may be performed according to the methods described herein. In some examples, aspects of the operations of 2115 may be performed by a signal transmission manager as described with reference to FIGS. 13 through 16.

Figure 22:
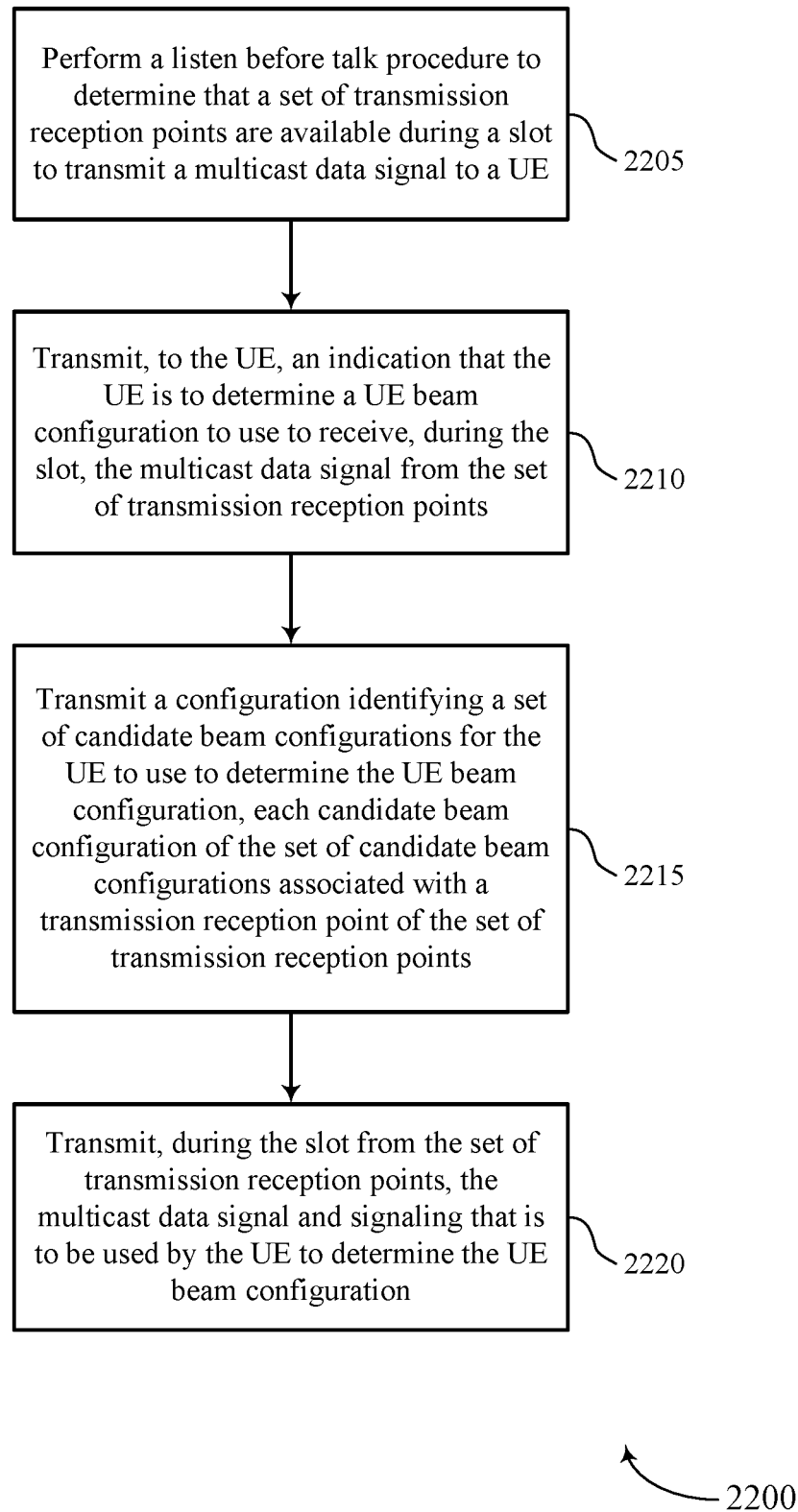

FIG. 22 shows a flowchart illustrating a method 2200 that supports dynamic single frequency network area with listen before talk uncertainty in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2205, the base station may perform a listen before talk procedure to determine that a set of transmission reception points are available during a slot to transmit a multicast data signal to a UE. The operations of 2205 may be performed according to the methods described herein. In some examples, aspects of the operations of 2205 may be performed by a LBT manager as described with reference to FIGS. 13 through 16.

At 2210, the base station may transmit, to the UE, an indication that the UE is to determine a UE beam configuration to use to receive, during the slot, the multicast data signal from the set of transmission reception points. The operations of 2210 may be performed according to the methods described herein. In some examples, aspects of the operations of 2210 may be performed by an indication transmission manager as described with reference to FIGS. 13 through 16.

At 2215, the base station may transmit a configuration identifying a set of candidate beam configurations for the UE to use to determine the UE beam configuration, each candidate beam configuration of the set of candidate beam configurations associated with a transmission reception point of the set of transmission reception points. The operations of 2215 may be performed according to the methods described herein. In some examples, aspects of the operations of 2215 may be performed by a UE configuration manager as described with reference to FIGS. 13 through 16.

At 2220, the base station may transmit, during the slot from the set of transmission reception points, the multicast data signal and signaling that is to be used by the UE to determine the UE beam configuration. The operations of 2220 may be performed according to the methods described herein. In some examples, aspects of the operations of 2220 may be performed by a signal transmission manager as described with reference to FIGS. 13 through 16.

Figure 23:
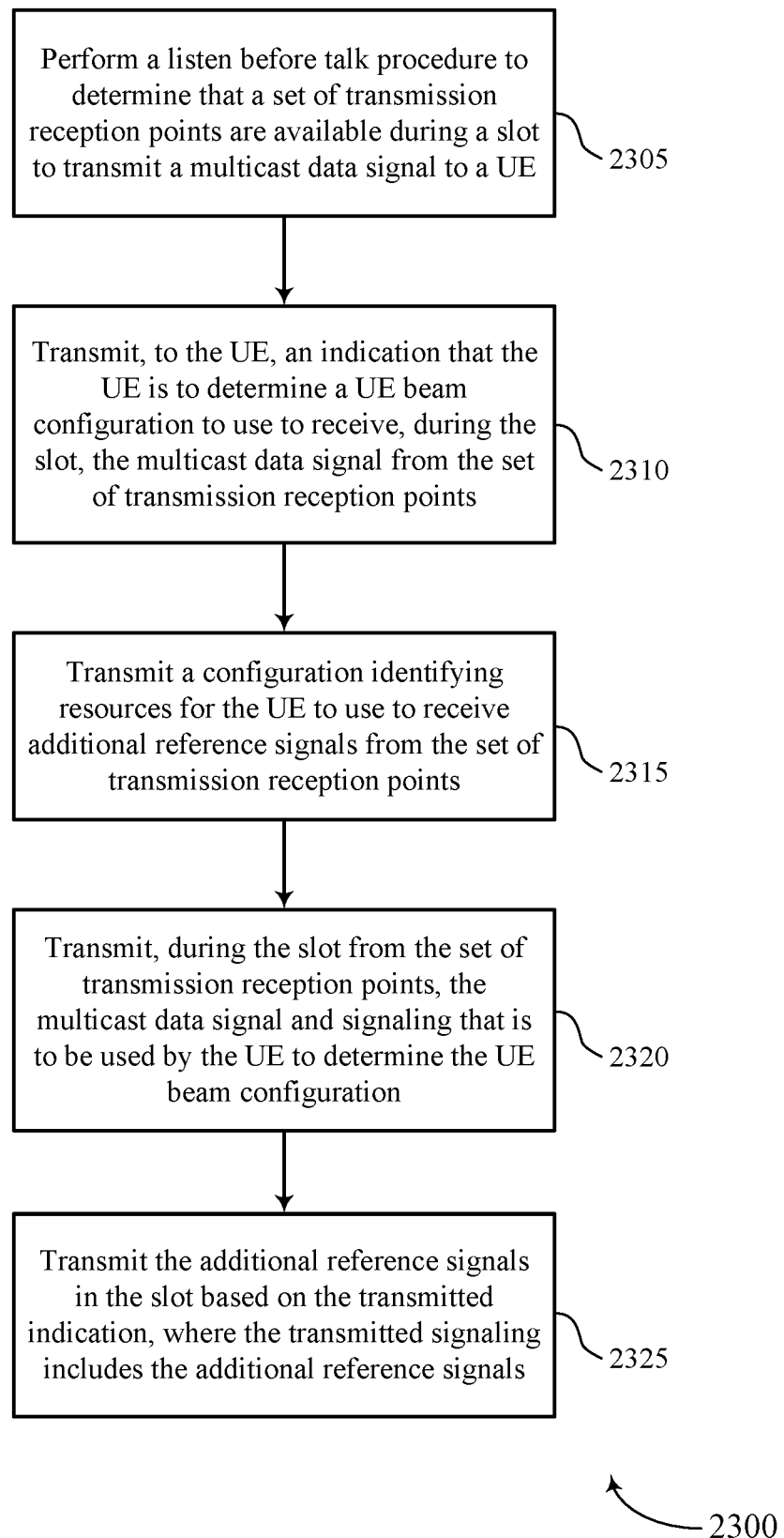

FIG. 23 shows a flowchart illustrating a method 2300 that supports dynamic single frequency network area with listen before talk uncertainty in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2305, the base station may perform a listen before talk procedure to determine that a set of transmission reception points are available during a slot to transmit a multicast data signal to a UE. The operations of 2305 may be performed according to the methods described herein. In some examples, aspects of the operations of 2305 may be performed by a LBT manager as described with reference to FIGS. 13 through 16.

At 2310, the base station may transmit, to the UE, an indication that the UE is to determine a UE beam configuration to use to receive, during the slot, the multicast data signal from the set of transmission reception points. The operations of 2310 may be performed according to the methods described herein. In some examples, aspects of the operations of 2310 may be performed by an indication transmission manager as described with reference to FIGS. 13 through 16.

At 2315, the base station may transmit a configuration identifying resources for the UE to use to receive additional reference signals from the set of transmission reception points. The operations of 2315 may be performed according to the methods described herein. In some examples, aspects of the operations of 2315 may be performed by a UE configuration manager as described with reference to FIGS. 13 through 16.

At 2320, the base station may transmit, during the slot from the set of transmission reception points, the multicast data signal and signaling that is to be used by the UE to determine the UE beam configuration. The operations of 2320 may be performed according to the methods described herein. In some examples, aspects of the operations of 2320 may be performed by a signal transmission manager as described with reference to FIGS. 13 through 16.

At 2325, the base station may transmit the additional reference signals in the slot based on the transmitted indication, where the transmitted signaling includes the additional reference signals. The operations of 2325 may be performed according to the methods described herein. In some examples, aspects of the operations of 2325 may be performed by a signal transmission manager as described with reference to FIGS. 13 through 16.

Figure 24:
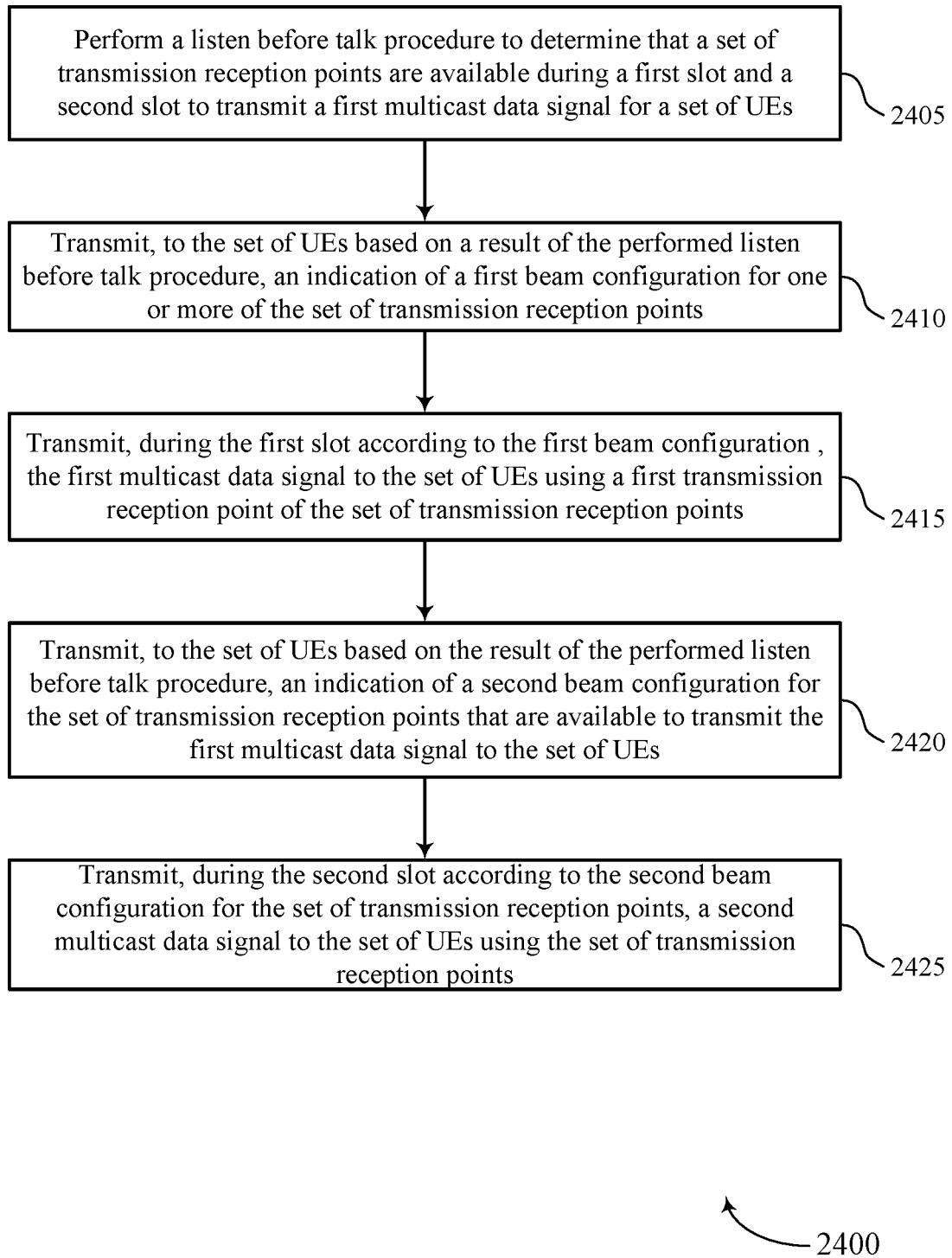

FIG. 24 shows a flowchart illustrating a method 2400 that supports dynamic single frequency network area with listen before talk uncertainty in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2405, the base station may perform a listen before talk procedure to determine that a set of transmission reception points are available during a first slot and a second slot to transmit a first multicast data signal for a set of UEs. The operations of 2405 may be performed according to the methods described herein. In some examples, aspects of the operations of 2405 may be performed by a LBT manager as described with reference to FIGS. 13 through 16.

At 2410, the base station may transmit, to the set of UEs based on a result of the performed listen before talk procedure, an indication of a first beam configuration for one or more of the set of transmission reception points. The operations of 2410 may be performed according to the methods described herein. In some examples, aspects of the operations of 2410 may be performed by a beam configuration manager as described with reference to FIGS. 13 through 16.

At 2415, the base station may transmit, during the first slot according to the first beam configuration, the first multicast data signal to the set of UEs using a first transmission reception point of the set of transmission reception points. The operations of 2415 may be performed according to the methods described herein. In some examples, aspects of the operations of 2415 may be performed by a signal transmission manager as described with reference to FIGS. 13 through 16.

At 2420, the base station may transmit, to the set of UEs based on the result of the performed listen before talk procedure, an indication of a second beam configuration for the set of transmission reception points that are available to transmit the first multicast data signal to the set of UEs. The operations of 2420 may be performed according to the methods described herein. In some examples, aspects of the operations of 2420 may be performed by a beam configuration manager as described with reference to FIGS. 13 through 16.

At 2425, the base station may transmit, during the second slot according to the second beam configuration for the set of transmission reception points, a second multicast data signal to the set of UEs using the set of transmission reception points. The operations of 2425 may be performed according to the methods described herein. In some examples, aspects of the operations of 2425 may be performed by a signal transmission manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving an indication that the UE is to determine a UE beam configuration to use to receive, during a slot, a multicast data signal from a plurality of transmission reception points;

receiving, during a slot from the plurality of transmission reception points, the multicast data signal and signaling that is used to determine the UE beam configuration;

determining, based at least in part on the received indication and the received signaling, the UE beam configuration for the slot; and decoding the received multicast data signal based at least in part on the determined UE beam configuration.

2. The method of claim 1, further comprising:

determining that the multicast data signal is from the plurality of transmission reception points based at least in part on the received signaling that is used to determine the UE beam configuration; and identifying a set of candidate beam configurations associated with the plurality of transmission reception points, wherein the UE beam configuration for the slot is determined based at least in part on a combination of the identified set of candidate beam configurations.

3. The method of claim 2, further comprising:

receiving a configuration identifying the set of candidate beam configurations, each candidate beam configuration of the set of candidate beam configurations associated with a transmission reception point of the plurality of transmission reception points.

4. The method of claim 2, wherein the received signaling comprises a plurality of activity signals, each activity signal of the plurality of activity signals corresponding to one of the plurality of transmission reception points.

5. The method of claim 1, further comprising:

identifying, based at least in part on the received indication, a presence of additional reference signals from the plurality transmission reception points; and receiving the additional reference signals in the slot based at least in part on the identifying, wherein the UE beam configuration for the slot is determined based at least in part on the received additional reference signals.

6. The method of claim 5, further comprising:

receiving a configuration identifying resources for the UE to use to receive the additional reference signals.

7. The method of claim 5, wherein the additional reference signals comprise demodulation reference signals.

8. The method of claim 5, wherein the additional reference signals are received in a first one or more symbol periods of the slot that precede a second one or more symbol periods of the slot associated with the received multicast data signal.

9. The method of claim 1, further comprising:

determining a quasi co-location relationship associated with the received multicast data signal based at least in part on the received signaling, wherein the received multicast data signal is decoded based at least in part on the determined quasi co-location relationship.

10. The method of claim 1, wherein the indication is received in a control channel transmission.

11. The method of claim 1, wherein the UE beam configuration comprises a transmission configuration indication state.

12. The method of claim 1, wherein the multicast data signal is received on a downlink shared channel.

13. A method for wireless communications at a base station, comprising:

performing a listen before talk procedure to determine that a plurality of transmission reception points are available during a slot to transmit a multicast data signal to a user equipment (UE);

transmitting, to the UE, an indication that the UE is to determine a UE beam configuration to use to receive, during the slot, the multicast data signal from the plurality of transmission reception points; and transmitting, during the slot from the plurality of transmission reception points, the multicast data signal and signaling that is to be used by the UE to determine the UE beam configuration.

14. The method of claim 13, further comprising:

transmitting a configuration identifying a set of candidate beam configurations for the UE to use to determine the UE beam configuration, each candidate beam configuration of the set of candidate beam configurations associated with a transmission reception point of the plurality of transmission reception points.

15. The method of claim 13, wherein the transmitted signaling comprises a plurality of activity signals, each activity signal of the plurality of activity signals corresponding to one of the plurality of transmission reception points.

16. The method of claim 13, further comprising:

transmitting a configuration identifying resources for the UE to use to receive additional reference signals from the plurality of transmission reception points; and transmitting the additional reference signals in the slot based at least in part on the transmitted indication, wherein the transmitted signaling comprises the additional reference signals.

17. The method of claim 16, wherein the additional reference signals comprise demodulation reference signals.

18. The method of claim 16, wherein the additional reference signals are transmitted in a first one or more symbol periods of the slot that precede a second one or more symbol periods of the slot associated with the transmitted multicast data signal.

19. The method of claim 13, wherein the indication is transmitted in a control channel transmission.

20. A method for wireless communications at a base station, comprising:

performing a listen before talk procedure to determine that a plurality of transmission reception points are available during a first slot and a second slot to transmit a first multicast data signal for a set of user equipments (UEs);

transmitting, to the set of UEs based at least in part on a result of the performed listen before talk procedure, an indication of a first beam configuration for one or more of the plurality of transmission reception points;

transmitting, during the first slot according to the first beam configuration, the first multicast data signal to the set of UEs using a first transmission reception point of the plurality of transmission reception points;

transmitting, to the set of UEs based at least in part on the result of the performed listen before talk procedure, an indication of a second beam configuration for the plurality of transmission reception points that are available to transmit the first multicast data signal to the set of UEs; and transmitting, during the second slot according to the second beam configuration for the plurality of transmission reception points, a second multicast data signal to the set of UEs using the plurality of transmission reception points.

21. The method of claim 20, wherein the first transmission reception point comprises the one or more of the plurality of transmission reception points, and the first beam configuration is for the first transmission reception point.

22. The method of claim 21, further comprising:
determining to transmit, during the first slot, unicast data signals using a remaining one or more transmission reception points of the plurality of transmission reception points.

23. The method of claim 21, further comprising:
refraining from transmitting, during the first slot based at least in part on the result of the performed listen before talk procedure, the first multicast data signal to the set of UEs using a remaining one or more transmission reception points of the plurality of transmission reception points.

24. The method of claim 23, wherein the first transmission reception point comprises a serving cell for the set of UEs, and the remaining one or more transmission reception points comprise non-serving cells for the set of UEs.

25. The method of claim 21, wherein the first beam configuration is consistent with the transmission reception points that pass the performed listen before talk procedure for the first slot, and the second beam configuration is consistent with the transmission reception points that pass the performed listen before talk procedure for the second slot.

26. The method of claim 20, wherein the one or more of the plurality of transmission reception points comprise the plurality of transmission reception points, and the first beam configuration is for the plurality of transmission reception points.

27. An apparatus for wireless communications at a user equipment (UE), comprising:
a processor,
memory coupled with the processor; and
instructions stored in the memory and executable by the processor to cause the apparatus to:
receive an indication that the UE is to determine a UE beam configuration to use to receive, during a slot, a multicast data signal from a plurality of transmission reception points;
receive, during a slot from the plurality of transmission reception points, the multicast data signal and signaling that is used to determine the UE beam configuration;
determine, based at least in part on the received indication and the received signaling, the UE beam configuration for the slot; and
decode the received multicast data signal based at least in part on the determined UE beam configuration.

28. The apparatus of claim 27, wherein the instructions are further executable by the processor to cause the apparatus to:
determine that the multicast data signal is from the plurality of transmission reception points based at least in part on the received signaling that is used to determine the UE beam configuration; and
identify a set of candidate beam configurations associated with the plurality of transmission reception points, wherein the UE beam configuration for the slot is determined based at least in part on a combination of the identified set of candidate beam configurations.

29. The apparatus of claim 28, wherein the instructions are further executable by the processor to cause the apparatus to:
receive a configuration identifying the set of candidate beam configurations, each candidate beam configuration of the set of candidate beam configurations associated with a transmission reception point of the plurality of transmission reception points.

30. The apparatus of claim 29, wherein the received signaling comprises a plurality of activity signals, each activity signal of the plurality of activity signals corresponding to one of the plurality of transmission reception points.

* * * * *